(12) United States Patent
Yoshimi et al.

(10) Patent No.: US 11,772,239 B2
(45) Date of Patent: Oct. 3, 2023

(54) CLAMPING APPARATUS

(71) Applicant: KOSMEK LTD., Kobe (JP)

(72) Inventors: Masahiro Yoshimi, Kobe (JP); Junichi Goto, Kobe (JP)

(73) Assignee: KOSMEK LTD, Kobe (JP)

( * ) Notice: Subject to any disclaimer, the term of this patent is extended or adjusted under 35 U.S.C. 154(b) by 212 days.

(21) Appl. No.: 17/311,764

(22) PCT Filed: Dec. 6, 2019

(86) PCT No.: PCT/JP2019/047790
§ 371 (c)(1),
(2) Date: Jun. 8, 2021

(87) PCT Pub. No.: WO2020/121960
PCT Pub. Date: Jun. 18, 2020

(65) Prior Publication Data
US 2022/0024000 A1    Jan. 27, 2022

(30) Foreign Application Priority Data

Dec. 10, 2018  (JP) .................................. 2018-230576

(51) Int. Cl.
*B25B 5/00* (2006.01)
*B25B 5/16* (2006.01)
(Continued)

(52) U.S. Cl.
CPC ................. *B25B 5/16* (2013.01); *B25B 5/02* (2013.01); *B25B 5/061* (2013.01)

(58) Field of Classification Search
CPC .... B25B 5/00; B25B 5/02; B25B 5/16; B25B 5/061; B25B 5/04; B25B 5/12
See application file for complete search history.

(56) References Cited

U.S. PATENT DOCUMENTS

| 7,188,832 B2* | 3/2007 | Kita ........................ B25B 5/087 269/24 |
| 2011/0291341 A1* | 12/2011 | Sawdon .................. B25B 5/062 269/216 |

(Continued)

FOREIGN PATENT DOCUMENTS

| EP | 2868430 A1 | 5/2015 |
| EP | 3184235 A1 | 6/2017 |

(Continued)

OTHER PUBLICATIONS

Partial Supplementary Search Report dated Feb. 28, 2022 in corresponding European Appln. No. 19897111.1.

(Continued)

*Primary Examiner* — Lee D Wilson
(74) *Attorney, Agent, or Firm* — BACON & THOMAS, PLLC

(57) ABSTRACT

A clamping apparatus includes: a support member (19) inserted in a leading-end-side portion of the housing (1) so as to be movable in its axial direction; a resistance giving mechanism (34) configured to give resistance to axial movement of the support member (19); and an engagement maintaining mechanism (26) configured to maintain engagement between a wedge surface (24) of a clamp rod (7) and a locking member (23). When the clamp rod (7) is driven toward a leading end side for unclamping action, the clamp rod (7) moves the locking member (23) toward the leading end side via the support member (19) after the locking member (23) moves radially inward.

11 Claims, 20 Drawing Sheets

(51) Int. Cl.
  *B25B 5/02*   (2006.01)
  *B25B 5/06*   (2006.01)

(56) References Cited

U.S. PATENT DOCUMENTS

| | | | | |
|---|---|---|---|---|
| 2016/0129558 A1* | 5/2016 | Schauss | ................. | B25B 5/163 |
| | | | | 269/229 |
| 2020/0346324 A1* | 11/2020 | Ishii | ......................... | B25B 5/16 |
| 2022/0024000 A1* | 1/2022 | Yoshimi | ................... | B25B 5/16 |

FOREIGN PATENT DOCUMENTS

| | | |
|---|---|---|
| JP | 2016-107370 A | 6/2016 |
| JP | 2017100271 A | 6/2017 |
| JP | 2018-8324 A | 1/2018 |
| WO | 2007-074737 A1 | 6/2009 |

OTHER PUBLICATIONS

International Search Report dated Mar. 3, 2020, issued in corresponding PCT application No. PCT/JP2019/047790.
International Preliminary Examination Report issued in corresponding PCT application No. PCT/JP2019/047790.
Invitation pursuant to Rules 62a(1) EPC dated Dec. 10, 2021 in the corresponding European application No. 19897111.1.

* cited by examiner

CLAMPING APPARATUS

TECHNICAL FIELD

The present invention relates to an apparatus configured to clamp an object such as a workpiece.

BACKGROUND ART

Known examples of such a clamping apparatus include an apparatus described in Patent Literature 1 specified below. The known apparatus is structured as follows.

The clamping apparatus described in Patent Literature 1 includes: locking members insertable into a hole of a workpiece; a clamp rod configured to make wedge engagement from above with the locking members; and an advance spring pushing the locking members upward (toward an unclamping side) with a predetermined amount of force. A peripheral wall of the hole of the workpiece is pressed from above by protrusions of the locking members, and thereby the workpiece is clamped.

CITATION LIST

Patent Literature

Patent Literature 1: Japanese Unexamined Patent Publication No. 2016-107370

SUMMARY OF INVENTION

Technical Problem

The above-described known apparatus has the following disadvantages.

Depending on the structures of elements of the clamping apparatus, outer peripheral surfaces of base portions of the locking members may, due to plastic deformation, bite into or come into strong and close contact with an inner peripheral surface of the hole of the workpiece when the locking members are in a diameter-expanded position, that is, when the apparatus is in a clamping state.

If the clamp rod in the above situation is moved upward (toward the unclamping side), the locking members ascend while holding the workpiece, and this may unintentionally change the position of the workpiece.

A first object of the present invention is to provide a clamping apparatus capable of reducing or minimizing the possibility that a to-be-clamped object such as a workpiece is lifted up in unclamping action.

The known apparatus described in Patent Literature 1 further has the following problem to be solved. If the locking members are moved excessively radially outward in clamping action, the inner peripheral surface of the hole of the workpiece may be damaged by the locking members. The clamping apparatus of Patent Literature 1 includes a relative movement restriction mechanism to reduce or minimize such damage. The mechanism includes: a pin; and pin-holding holes provided in a peripheral wall of a base-end-side portion of a guide member, and the pin is inserted in the holes. The relative movement restriction mechanism has, however, a complicated structure.

A second object of the present invention is to provide a clamping apparatus including a simpler mechanism capable of reducing or minimizing damage to an inner peripheral surface of a hole of a to-be-clamped object such as a workpiece in clamping action.

Solution to Problem

In order to achieve the above first object, in an aspect of the present invention, a clamping apparatus is structured as follows, as shown in FIG. 1 to FIG. 18, for example.

A clamping apparatus to achieve the first object of the present invention includes: a housing 1; a locking member 23 protruding toward a leading end side relative to the housing 1 and configured to be insertable into a hole Wa of a to-be-clamped object W; a clamp rod 7 including a wedge surface 24 configured to be engaged with the locking member 23 from the leading end side; a driving means 13 configured to drive the clamp rod 7 toward a base end side for clamping action and to drive the clamp rod 7 toward the leading end side for unclamping action; a support member 19 supporting a base end portion of the locking member 23 so that the locking member 23 is radially movable, the support member 19 being inserted in a leading-end-side portion of the housing 1 so as to be movable in its axial direction; a resistance giving mechanism 34 configured to give resistance to axial movement of the support member 19 with respect to both directions toward the leading end side and toward the base end side; and an engagement maintaining mechanism 26 which allows the wedge surface 24 of the clamp rod 7 to be engaged with the locking member 23 so as to be movable relative to each other. When the clamp rod 7 is driven toward the leading end side for unclamping action, the clamp rod 7 moves the locking member 23 toward the leading end side via the support member 19 after the locking member 23 moves radially inward.

The clamping apparatus of the above aspect of the present invention provides the following functions and effects.

Even if an outer peripheral surface of the locking member bites into or is in strong and close contact with an inner peripheral surface of the hole of the object, it is possible to reduce or minimize the possibility that the locking member moves toward the leading end side while holding the object, because the locking member moves toward the leading end side after moving radially inward, when the clamp rod is driven for unclamping action.

In the clamping apparatus of the above aspect of the invention, it is preferable that the support member 19 includes a tubular portion 20 in which the clamp rod 7 is inserted so as to be movable in the axial direction, and that the resistance giving mechanism 34 includes: an annular groove 32 provided on an outer peripheral surface of the tubular portion 20; and a ring-like elastic member 33 attached to the annular groove 32.

In this arrangement, the resistance giving mechanism can be easily produced.

Furthermore, the clamping apparatus of the above aspect of the invention may be arranged such that the support member 19 includes a tubular portion 20 in which the clamp rod 7 is inserted so as to be movable in the axial direction, and such that the resistance giving mechanism 34 includes: a lateral hole 38 bored in a side wall of a leading-end-side portion of the housing 1; and an engagement member 39 and a biasing means 40 which are attached in the lateral hole 38, the biasing means 40 being configured to bias the engagement member 39 toward the tubular portion 20.

Furthermore, the clamping apparatus of the above aspect of the invention may be arranged such that the support member 19 includes a tubular portion 20 in which the clamp rod 7 is inserted so as to be movable in the axial direction, and such that the resistance giving mechanism 34 includes: a wedge member 43 engaged from the base end side with an inclined surface 42 provided on an outer periphery of the tubular portion 20 and inclined relative to the axial direction, the wedge member 43 being attached between the inclined surface 42 and an inner peripheral surface of the housing 1; a biasing means 44 configured to bias the wedge member 43 toward the leading end side; and a holding means 45 holding the biasing means 44 close to an outer peripheral surface of the tubular portion 20.

Furthermore, in the clamping apparatus of the above aspect of the invention, it is preferable that the engagement maintaining mechanism 26 includes: a rod-side engagement groove 24a or rod-side engagement portion provided on the wedge surface 24 of the clamp rod 7; and a locking-member-side engagement portion 25a configured to be fitted in the rod-side engagement groove 24a or a locking-member-side engagement groove in which the rod-side engagement portion is configured to be fitted, the engagement portion 25a or the engagement groove being provided on the locking member 23.

This arrangement makes it possible to easily produce the engagement maintaining mechanism which operates stably.

Furthermore, it is preferable that the clamping apparatus of the above aspect of the invention further includes a relative movement restriction mechanism 31 configured to restrict radially outward movement of the locking member 23 relative to the clamp rod 7 within a predetermined range when the clamp rod 7 is driven toward the base end side for clamping action.

This arrangement reduces or minimizes the possibility that the outer peripheral surface of the locking member bites into or comes into strong and close contact with the inner peripheral surface of the hole of the object.

Furthermore, in the clamping apparatus of the above aspect of the invention, it is preferable that the relative movement restriction mechanism 31 is an annular protrusion 30 provided at a leading-end-side end portion of the housing 1 and protruding radially inward, and a hole in the annular protrusion 30 has a diameter equal to or smaller than a diameter of the hole Wa of the to-be-clamped object W.

In this arrangement, the relative movement restriction mechanism can be easily produced.

Furthermore, in the clamping apparatus of the above aspect of the invention, it is preferable that the support member 19 includes: a tubular portion 20 in which the clamp rod 7 is inserted so as to be movable in the axial direction; a peripheral wall portion 21 provided on the leading end side relative to the tubular portion 20, the peripheral wall portion 21 having a guide hole 21a in which the locking member 23 is inserted so as to be radially movable; and a tapered top wall portion 22 provided on the leading end side relative to the peripheral wall portion 21.

Due to this arrangement of the support member, it is possible to prevent a peripheral wall of the hole of the object from colliding with the locking member when the object is placed. Furthermore, this makes the operation of the locking member more stable in clamping and unclamping action.

Furthermore, in the clamping apparatus of the above aspect of the invention, as shown in FIG. 13A to FIG. 15, FIG. 18, and FIG. 19, for example, it is preferable that the housing 1 includes: a lower housing 2; and a tubular upper housing 5, which is connected to a top surface of the lower housing 2 so as to be radially movable, and in which the support member 19 is inserted so as to be movable in the axial direction, and that the clamp rod 7 includes: a rod main body 52; and a rod leading end portion 54 connected to a leading end portion of the rod main body 52 via a pin 53 so as to be movable in a radial direction of the rod main body 52, the rod leading end portion 54 being provided with the wedge surface 24.

In this arrangement, even if the hole of the object is slightly misaligned, it is possible to preferably fit the hole over the peripheral wall portion of the support member.

Furthermore, in the clamping apparatus of the above aspect of the invention, as shown in FIG. 16 and FIG. 17, for example, it is preferable that the housing 1 includes: a lower housing 2; and a tubular upper housing 5, which is fixed to a top surface of the lower housing 2, and in which the support member 19 is inserted so as to be movable in its axial direction and radial direction, and that the clamp rod 7 includes: a rod main body 52; and a rod leading end portion 54 connected to a leading end portion of the rod main body 52 via a pin 53 so as to be movable in a radial direction of the rod main body 52, the rod leading end portion 54 being provided with the wedge surface 24.

In this arrangement, even if the hole of the object is slightly misaligned, it is possible to preferably fit the hole over the peripheral wall portion of the support member.

In order to achieve the above second object, in another aspect of the present invention, a clamping apparatus is structured as follows, as shown in FIG. 1 to FIG. 10, and FIG. 13A to FIG. 19, for example.

A clamping apparatus to achieve the second object of the present invention includes: a housing 1; a locking member 23 protruding toward a leading end side relative to the housing 1 and configured to be insertable into a hole Wa of a to-be-clamped object W; a clamp rod 7 including a wedge surface 24 configured to be engaged with the locking member 23 from the leading end side; a driving means 13 configured to drive the clamp rod 7 toward a base end side for clamping action and to drive the clamp rod 7 toward the leading end side for unclamping action; a support member 19 supporting a base end portion of the locking member 23 so that the locking member 23 is radially movable, the support member 19 being inserted in a leading-end-side portion of the housing 1 so as to be movable in its axial direction; an engagement maintaining mechanism 26 which allows the wedge surface 24 of the clamp rod 7 to be engaged with the locking member 23 so as to be movable relative to each other; and a relative movement restriction mechanism 31 configured to restrict radially outward movement of the locking member 23 relative to the clamp rod 7 within a predetermined range when the clamp rod 7 is driven toward the base end side for clamping action. The relative movement restriction mechanism 31 is an annular protrusion 30 provided at a leading-end-side end portion of the housing 1 and protruding radially inward, and a hole in the annular protrusion 30 has a diameter equal to or smaller than a diameter of the hole Wa of the to-be-clamped object W.

In this configuration, damage to an inner peripheral surface of the hole of the to-be-clamped object in the clamping action can be reduced or minimized by a simpler structure.

Advantageous Effects of Invention

According to embodiments of the clamping apparatus to achieve the first object of the present invention, it is possible to reduce or minimize the possibility that a to-be-clamped object such as a workpiece is lifted up in unclamping action.

According to embodiments of the clamping apparatus to achieve the second object of the present invention, damage to an inner peripheral surface of a hole of a to-be-clamped object in clamping action can be reduced or minimized by a simpler structure.

DESCRIPTION OF EMBODIMENTS

Figure 1:
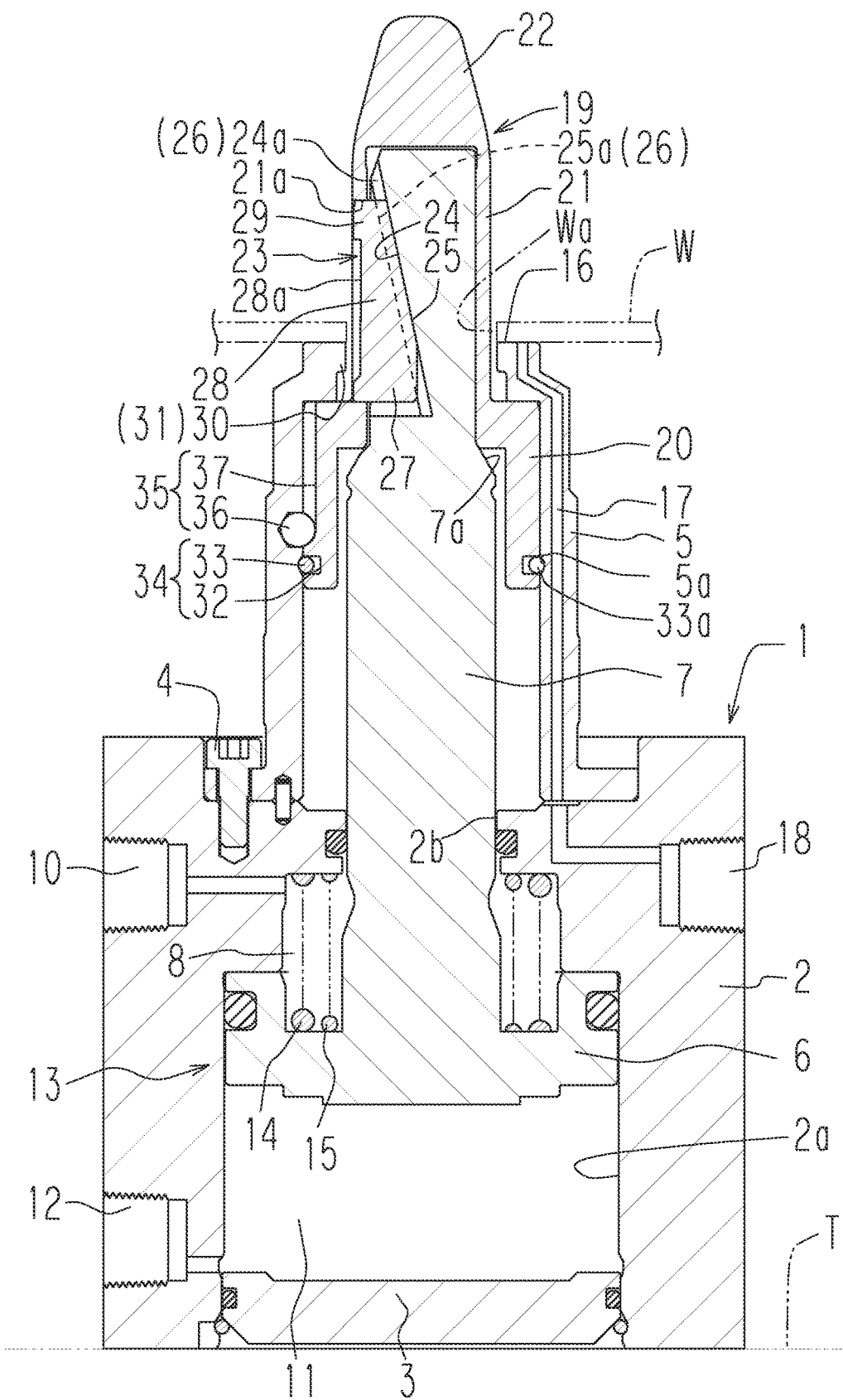
FIG. 1 shows a first embodiment of the present invention, and is an elevational view in section of a clamping apparatus in an unclamping state.

FIG. 1 to FIG. 4 show a first embodiment of the present invention. A clamping apparatus of this embodiment is used to fasten a workpiece W functioning as a to-be-clamped object. The workpiece W is, for example, a steel plate used as material for automotive panels with a thickness of approximately 1 mm to 2 mm, for example. The workpiece W has a hole Wa.

The structure of the clamping apparatus of the first embodiment of the present invention will be described with reference to FIG. 1 to FIG. 4.

A housing 1 is attached to a stationary stand T such as a table. The housing 1 includes: a lower housing 2; a lid member 3 which hermetically closes an opening of a lower end portion of a cylinder hole 2a provided in the lower housing 2; and a tubular upper housing 5 fixed to a top surface of the lower housing 2 with a bolt 4. The lower housing 2 has the cylinder hole 2a and a small-diameter hole 2b, which are provided from bottom to top in this order.

A piston 6 is hermetically inserted in the cylinder hole 2a. A clamp rod 7 protruding upward from the piston 6 is hermetically inserted in the small-diameter hole 2b. Compressed air is supplied to and discharged from a clamp chamber 8 provided above the piston 6 via an air supply and discharge port 10. Compressed air is also supplied to and discharged from an unclamp chamber 11 provided below the piston 6 via another air supply and discharge port 12. The piston 6, the clamp chamber 8, and the unclamp chamber 11 constitute a driving means 13 configured to drive the clamp rod 7 downward for clamping action and to drive the clamp rod 7 upward for unclamping action. Although the clamp rod 7 and the piston 6 are unitary with each other in this embodiment, these may be separately formed and then fixed into one piece. Springs 14 and 15 functioning as a biasing means are housed in the clamp chamber 8. The springs 14 and 15 bias the clamp rod 7 downward via the piston 6.

A seat portion 16 configured to receive the workpiece W is provided on an upper end surface of the upper housing 5. A detection passage 17 extending in an up-down direction is provided in a side wall of the upper housing 5. An upper end of the detection passage 17 opens onto the seat portion 16, while a lower end of the detection passage 17 is communicatively connected to an air supply port 18.

A support member 19 is inserted in an upper-side portion of the upper housing 5 so as to be movable in its axial direction. The support member 19 includes: a tubular portion 20; a peripheral wall portion 21 having a diameter smaller than that of the tubular portion 20; and a top wall portion 22 tapered down toward its leading end. These portions are provided from bottom to top in this order. The peripheral wall portion 21 and the top wall portion 22 protrude upward relative to an upper end of the upper housing 5 and they are configured to be insertable into the hole Wa of the workpiece W.

The peripheral wall portion 21 has three guide holes 21a provided at intervals of 120 degrees in its circumferential direction. A locking member 23 is inserted in each of the guide holes 21a so as to be radially movable. Each locking member 23 has a proximal end portion 27, a base portion 28, and a protruding portion 29, which are provided from bottom to top in this order. The proximal end portion 27 is a portion which is supported from below by the tubular portion 20 of the support member 19. An outer peripheral surface of the protruding portion 29 is located radially outward relative to an outer peripheral surface 28a of the base portion 28. It should be noted that only one of the locking members 23 is shown in FIG. 1 and other figures.

An annular protrusion 30 protruding radially inward is provided at an upper end portion of the upper housing 5. The protrusion 30 constitutes a relative movement restriction mechanism 31 configured to restrict radially outward movement of the locking members 23 relative to the clamp rod 7 within a predetermined range when the clamp rod 7 is driven downward for clamping action. The diameter of the hole inside the protrusion 30 is designed to be equal to the diameter of the hole Wa of the workpiece W. The diameter of the hole inside the protrusion 30 may be smaller than that of the hole Wa of the workpiece W.

The clamp rod 7 is inserted in the tubular portion 20 and in the peripheral wall portion 21 from below so as to be movable in the axial direction. Wedge surfaces 24 are provided on an upper portion of the clamp rod 7. Each wedge surface 24 is engaged from above with an inclined surface 25 of the corresponding one of the locking members 23. The inclined surface 25 is provided opposite from the outer peripheral surface 28a. The wedge surfaces 24 and the inclined surfaces 25 are flat surfaces in this embodiment, and each surface is inclined so that the distance between the surface and the axis of the clamp rod 7 decreases downward. In this embodiment, three wedge surfaces 24 are provided at intervals of 120 degrees in the circumferential direction of the clamp rod 7, in correspondence with the number of the locking members 23.

On each wedge surface 24, there is provided a rod-side engagement groove 24a extending in the up-down direction along the wedge surface 24. On each inclined surface 25, there is provided a locking-member-side engagement portion 25a extending in the up-down direction along the inclined surface 25. Each locking-member-side engagement portion 25a is engaged with the corresponding rod-side engagement groove 24a. The locking-member-side engagement portions 25a and the rod-side engagement grooves 24a constitute an engagement maintaining mechanism 26 which allows the wedge surfaces 24 of the clamp rod 7 to be engaged with the respective inclined surfaces 25 of the locking members 23 so that the surfaces 24 and 25 are movable relative to each other.

A tapered surface 7a, tapering down toward a leading end, is provided on an outer periphery of the clamp rod 7.

The support member 19 is guided in the up-down direction by a straight-movement guiding mechanism 35. The straight-movement guiding mechanism 35 includes: a ball 36 attached in an inner peripheral wall of the upper housing 5; and a straight-movement guiding groove 37 provided on an outer peripheral surface of the tubular portion 20 of the support member 19 and extending in the up-down direction. The ball 36 is inserted in the straight-movement guiding groove 37.

An annular groove 32 is provided on an outer peripheral surface of a lower end portion of the tubular portion 20. A retaining ring 33 functioning as a ring-like elastic member is attached in the annular groove 32. The annular groove 32 and the retaining ring 33 constitute a resistance giving mechanism 34 configured to give resistance to the axial movement (movement in the up-down direction) of the support member 19 with respect to both directions toward the leading end side and toward the base end side. A portion indicated with the reference numeral 33a is a slit of the retaining ring 33. That is, the retaining ring 33 is a so-called C-shaped retaining ring. Instead of the C-shaped retaining ring, a complete-ring-shaped or O-shaped retaining ring may be used as a ring-like elastic member. An annular groove 5a is provided on an inner peripheral surface of the upper housing 5. The retaining ring 33 is fitted in the groove 5a in an unclamping state.

The clamping apparatus having the above-described structure operates as follows.

In the unclamping state shown in FIG. 1, compressed air in the clamp chamber 8 has been discharged, and compressed air has been supplied to the unclamp chamber 11. As a result, the piston 6 has moved the clamp rod 7 to an upper unclamping position against the biasing forces of the springs 14 and 15, and each locking member 23 has been retracted radially inward by the engagement maintaining mechanism 26.

In this state, the outer peripheral surface of the protruding portion 29 of each locking member 23 is located inward of an outer peripheral surface of the peripheral wall portion 21 of the support member 19. This prevents a peripheral wall of the hole Wa of the workpiece W from colliding with the locking members 23. As the workpiece W is lowered in this unclamping state, the hole Wa of the workpiece W is located around the peripheral wall portion 21 of the support member 19 and around the locking members 23, with a predetermined gap.

Figure 3:
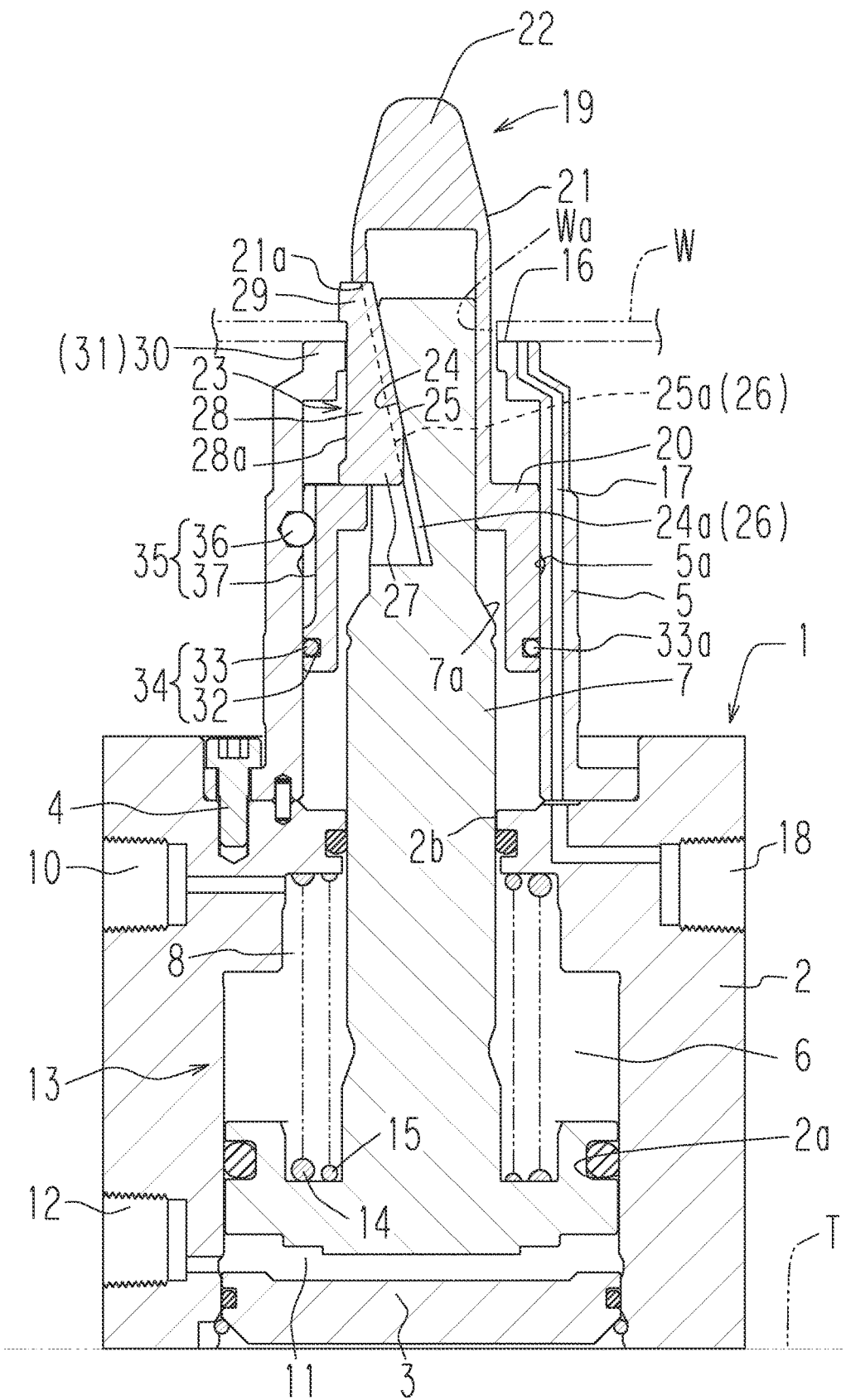
FIG. 3 is an elevational view in section of the clamping apparatus in the clamping state.

To cause the apparatus to transition from the unclamping state shown in FIG. 1 to a clamping state shown in FIG. 3, compressed air in the unclamp chamber 11 is discharged and compressed air is supplied to the clamp chamber 8, to lower the piston 6.

Figure 2:
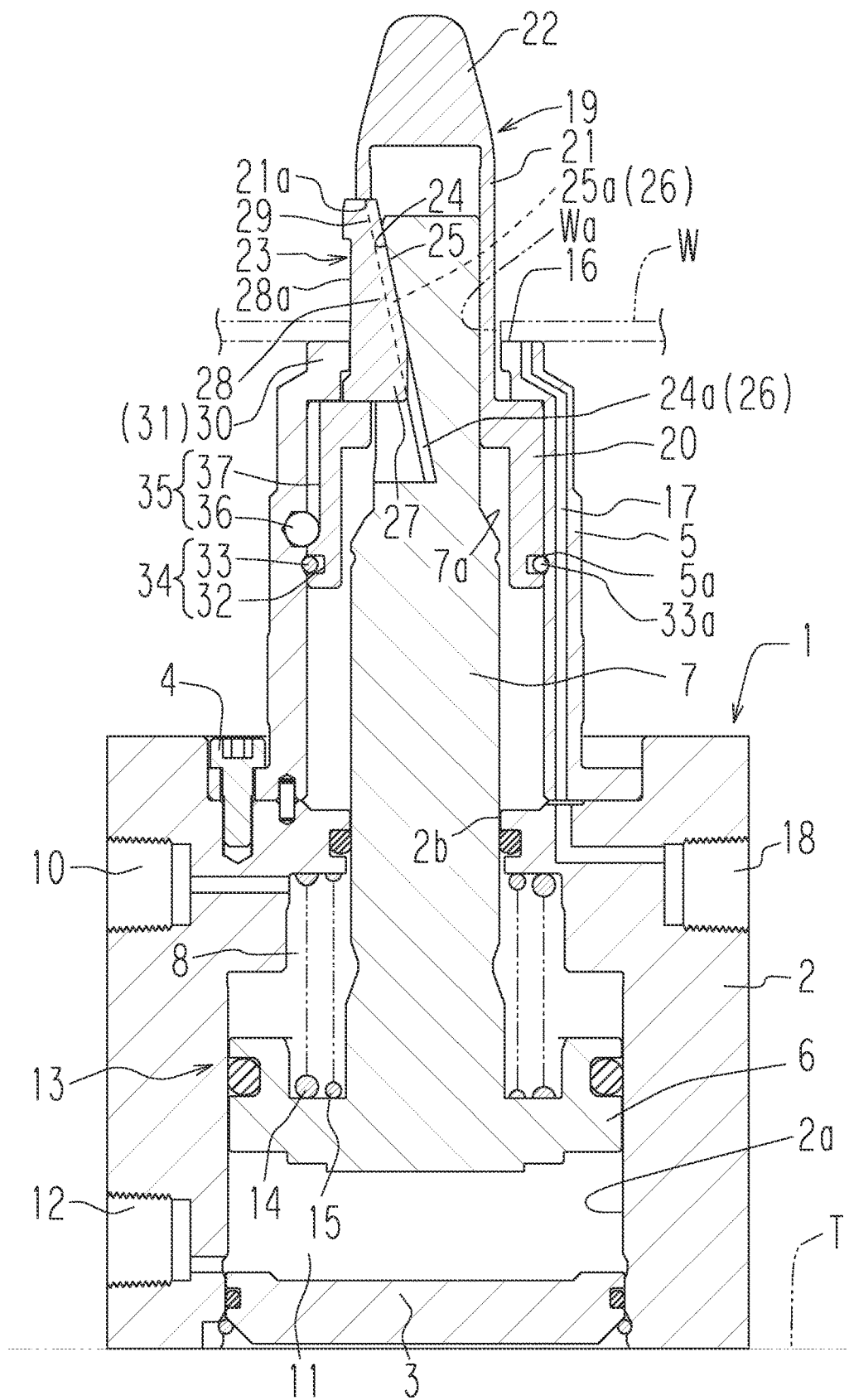
FIG. 2 is an elevational view in section of the clamping apparatus which is in the course of transition from the unclamping state to a clamping state.

As a result, the clamp rod 7 descends first, as shown in FIG. 2. Due to the elastic restoring force of the retaining ring 33 of the resistance giving mechanism 34, the support member 19 and the locking members 23 are held at their respective positions in the unclamping state shown in FIG. 1, or these members are slightly lowered.

As the clamp rod 7 descends, the wedge surfaces 24 push the locking members 23 radially outward to bring the outer peripheral surfaces 28a of the base portions 28 of the locking members 23 into contact with: an inner peripheral surface of the hole Wa of the workpiece W; and an inner peripheral surface of the protrusion 30 provided at the upper end portion of the upper housing 5. As the outer peripheral surfaces 28a of the base portions 28 of the locking members 23 are thus brought into contact with the inner peripheral surface of the hole Wa of the workpiece W, the workpiece W is positioned with respect to a horizontal direction. Meanwhile, the protruding portions 29 of the locking members 23 face the peripheral wall of the hole Wa from above.

After the locking members 23 come into contact with the inner peripheral surface of the protrusion 30, the locking members 23 cannot move radially outward anymore. Because of this, the wedge surfaces 24 of the clamp rod 7 push the locking members 23 and the support member 19 downward, with the result that the locking members 23 and the support member 19, as well as the clamp rod 7, descend together against the elastic restoring force of the retaining ring 33. Because the diameter of the hole in the protrusion 30 is designed to be equal to the diameter of the hole Wa of the workpiece W, the locking members 23 do not have a great impact onto the inner peripheral surface of the hole Wa of the workpiece W. Thus, damage to the inner peripheral surface of the hole Wa can be reduced or minimized.

Thereafter, as shown in FIG. 3, under surfaces of the protruding portions 29 of the locking members 23 reach the level of a top surface of the peripheral wall of the hole Wa of the workpiece W, and the peripheral wall of the hole Wa is pressed onto the seat portion 16 of the upper housing 5 by the protruding portions 29 of the locking members 23. The workpiece W is thus clamped. The biasing forces of the springs 14 and 15 housed in the clamp chamber 8 enhance the capability of holding the workpiece W.

In the clamping state shown in FIG. 3, the detection passage 17 is closed by an under surface of the workpiece W. Due to this, the pressure of pressurized air supplied to the detection passage 17 to detect the workpiece becomes higher than a set pressure. Such an increase in pressure is detected by a pressure switch or the like, to confirm that the workpiece W has been clamped.

To cause the apparatus to transition from the clamping state shown in FIG. 3 to the unclamping state shown in FIG. 1, compressed air in the clamp chamber 8 is discharged and compressed air is supplied to the unclamp chamber 11, to raise the piston 6.

Figure 4:
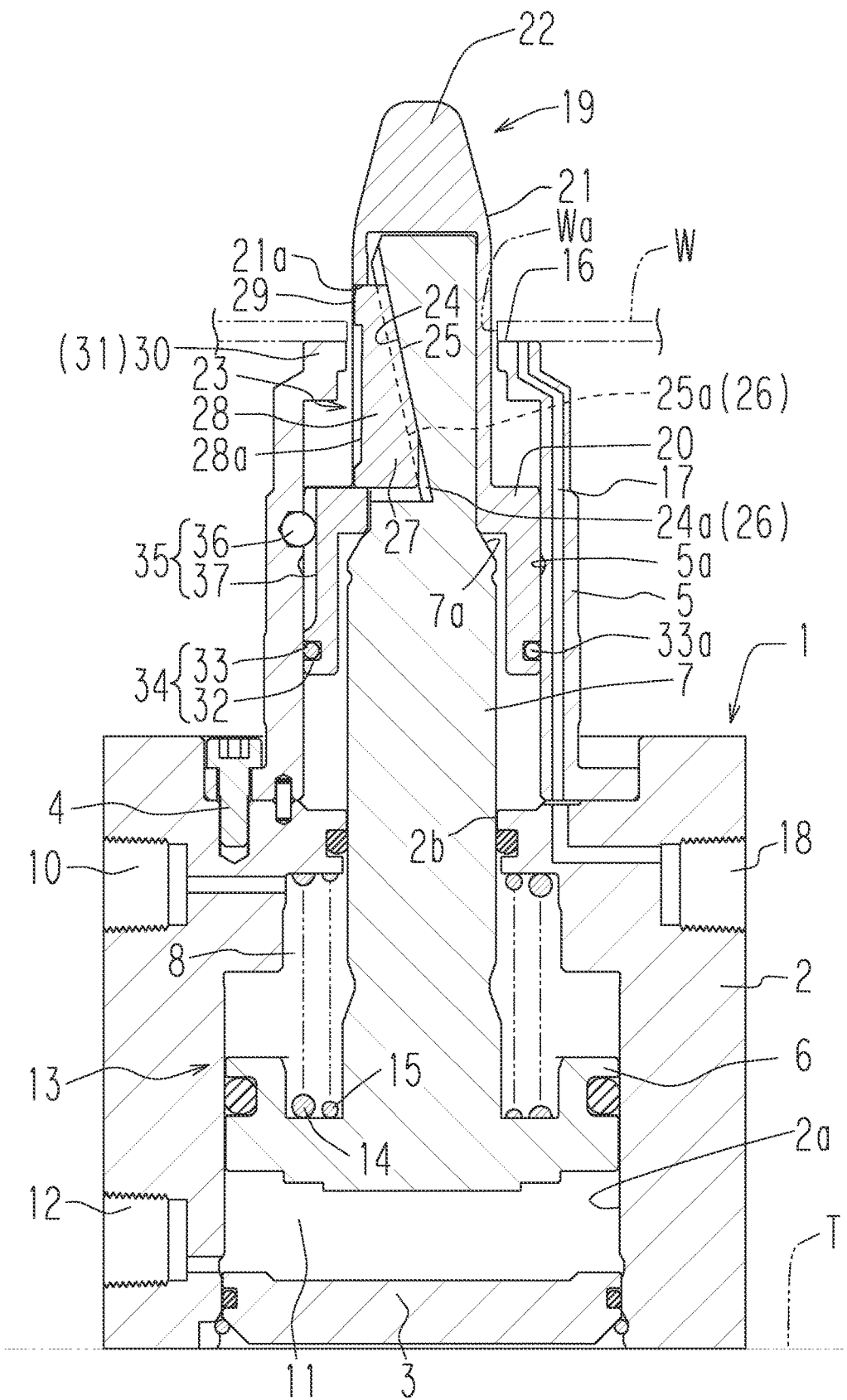
FIG. 4 is an elevational view in section of the clamping apparatus which is in the course of transition from the clamping state to the unclamping state shown in FIG. 1.

As a result, the clamp rod 7 ascends first, as shown in FIG. 4. The support member 19 and the locking members 23 are held at their respective positions in the clamping state shown in FIG. 3 (at their respective lowered positions) due to the elastic restoring force of the retaining ring 33 of the resistance giving mechanism 34.

As the clamp rod 7 ascends, the locking members 23 are retracted radially inward with the movement of the wedge surfaces 24, and therefore the protruding portions 29 of the locking members 23 are moved radially inward away from the peripheral wall of the hole Wa of the workpiece W. This is because: the upward movement of the locking members 23 is restricted by the support member 19 (i.e., the upward movement of the locking members 23 is restricted by upper end surfaces of the respective guide holes 21a); and the wedge surfaces 24 of the clamp rod 7 are respectively engaged with the locking members 23 by the engagement maintaining mechanism 26 so as to be relatively movable.

As the clamp rod 7 ascends further, the tapered surface 7a provided on the outer periphery of the clamp rod 7 comes to abut an inner peripheral edge portion of an upper end portion of the tubular portion 20 of the support member 19. Then the locking members 23 and the support member 19, as well as the clamp rod 7, ascend together against the elastic restoring force of the retaining ring 33. In other words, the clamp rod 7 moves the locking members 23 upward via the support member 19.

Thereafter, an upper end surface of the tubular portion 20 comes to abut an inner portion of a ceiling surface of the upper housing 5, which stops the ascent of the clamp rod 7, and the apparatus is into the unclamping state shown in FIG. 1.

Figure 5:
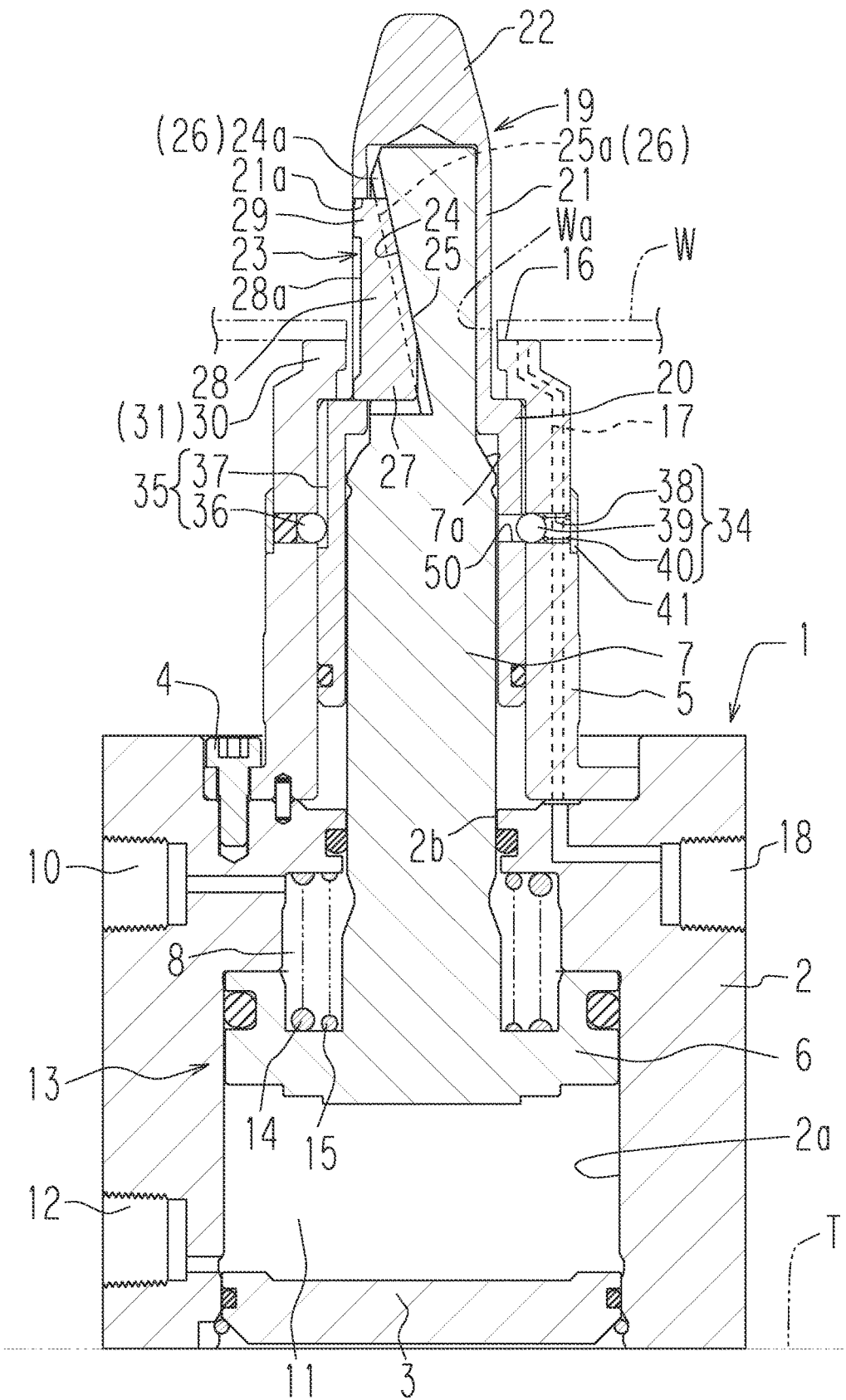
FIG. 5 shows a second embodiment of the present invention, and is an elevational view in section of a clamping apparatus in the unclamping state.
Figure 6:
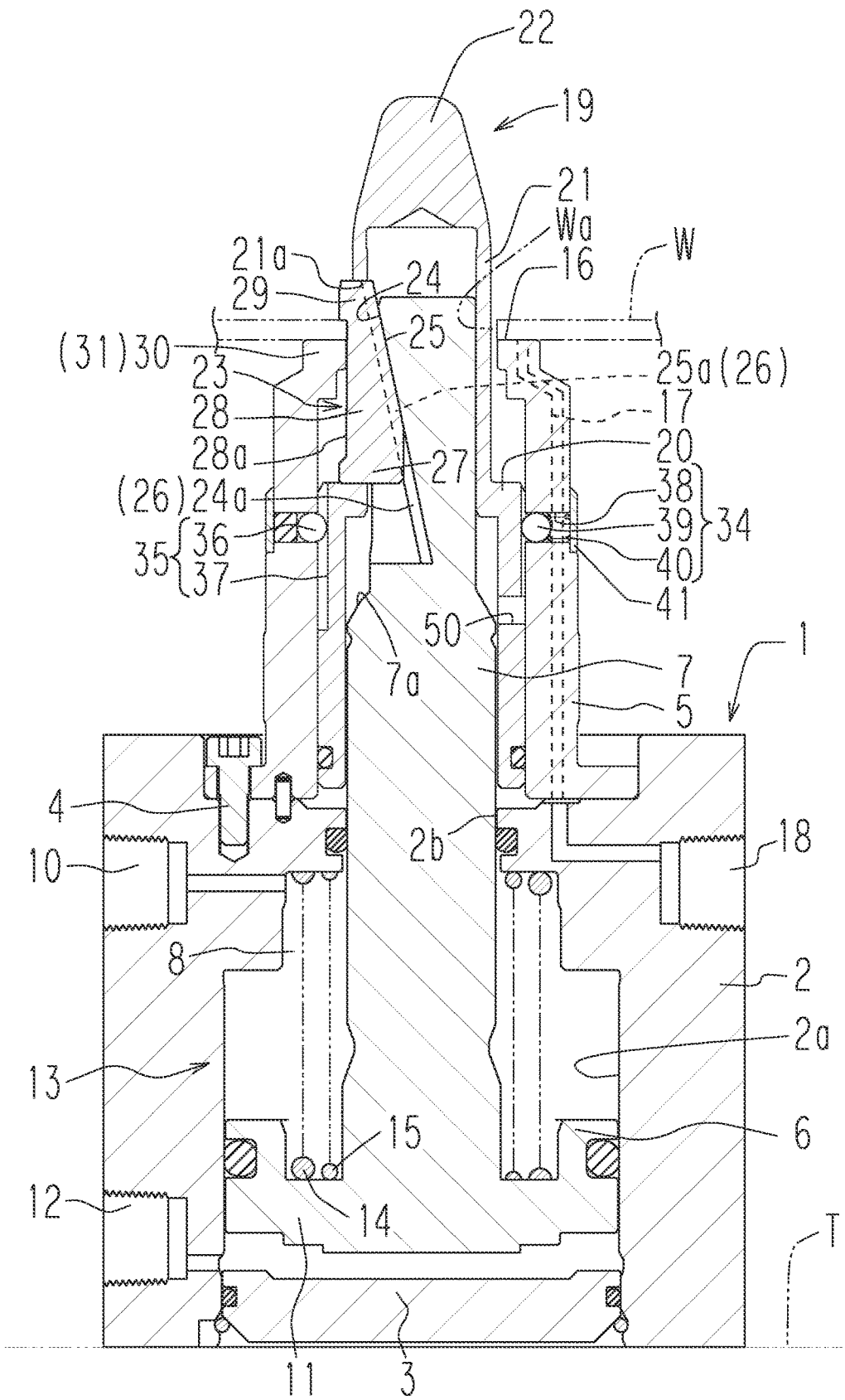
FIG. 6 is an elevational view in section of the clamping apparatus shown in FIG. 5, which is in the clamping state.
Figure 7:
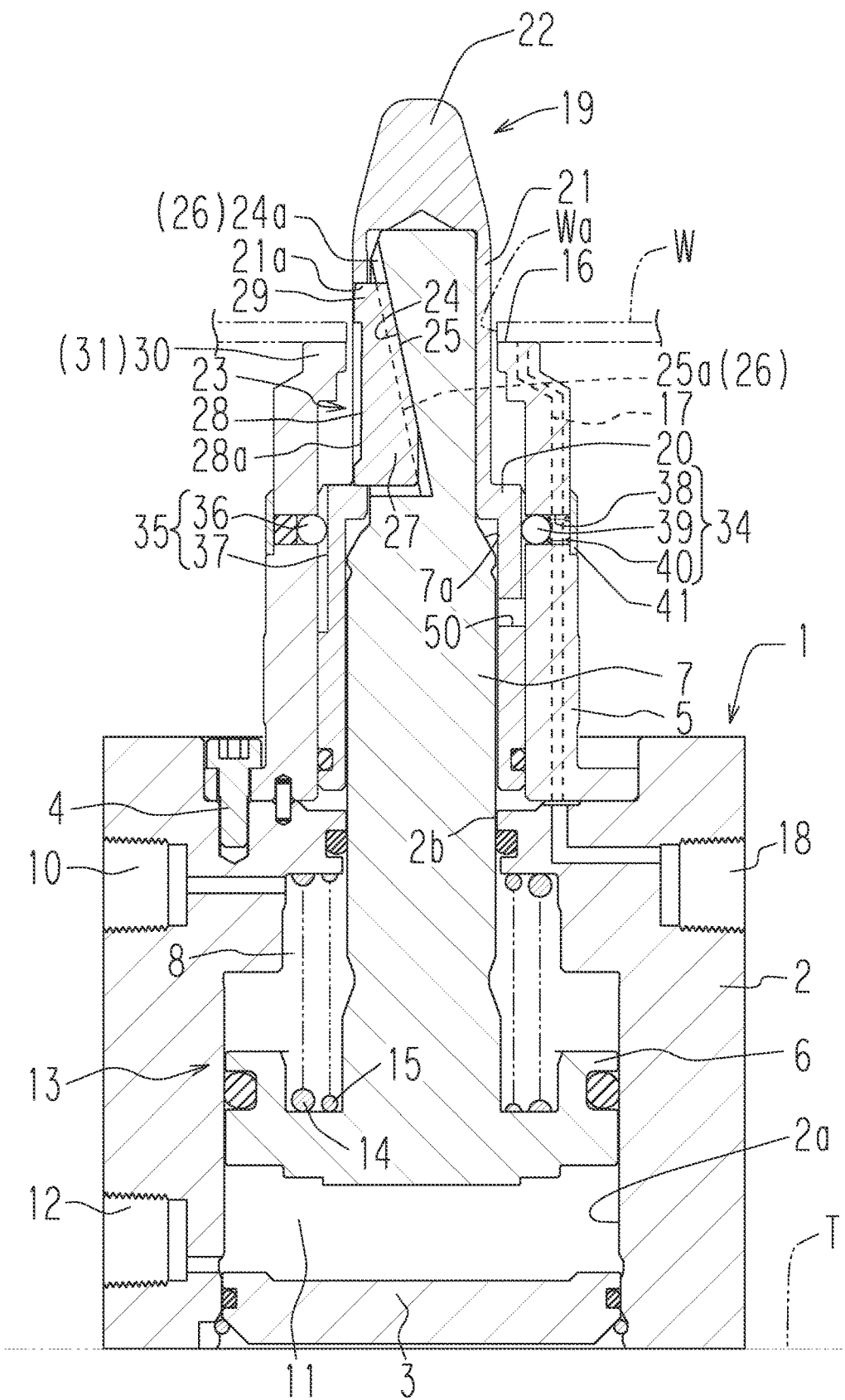
FIG. 7 is an elevational view in section of the clamping apparatus shown in FIG. 5, which is in the course of transition from the clamping state to the unclamping state shown in FIG. 5.

FIG. 5 to FIG. 7 show a second embodiment of the present invention. The following describes a difference between a clamping apparatus of the second embodiment and the clamping apparatus of the first embodiment.

The difference between the second embodiment and the first embodiment is in the structure of the resistance giving mechanism 34. The resistance giving mechanism 34 of the second embodiment is structured as follows.

A lateral hole 38 is bored in a side wall of the upper housing 5, that is, in a side wall of a leading-end-side portion of the housing 1. In the lateral hole 38, a ball 39 and a spring 40 are attached. The ball 39 functions as an engagement member, while the spring 40 functions as a biasing means configured to bias the ball 39 toward the tubular portion 20 of the support member 19. The lateral hole 38, the ball 39, and the spring 40 constitute the resistance giving mechanism 34. An annular plate 41 is attached to a portion of an outer peripheral surface of the upper housing 5, which is outward of the spring 40. Furthermore, a lateral hole 50, into which a portion of the ball 39 is fitted in the unclamping state, is bored in the tubular portion 20. The diameter of the lateral hole 50 is smaller than that of the lateral hole 38. Due to this, only a portion of the ball 39, which is smaller than a half thereof, is fitted in the lateral hole 50 when the support member 19 is at its raised position. The ball 39 is always attached in the lateral hole 38, as well as the spring 40.

The clamping apparatus of the second embodiment operates as follows, when the clamping apparatus is driven for the unclamping action from the clamping state shown in FIG. 6 to the unclamping state shown in FIG. 5.

In the clamping apparatus in the above-described clamping state, compressed air in the clamp chamber 8 is discharged and compressed air is supplied to the unclamp chamber 11, to raise the piston 6. As a result, the clamp rod 7 ascends first, as shown in FIG. 7. The support member 19 and the locking members 23 are held at their respective positions in the clamping state shown in FIG. 6 (at their respective lowered positions) by the elastic restoring force of the spring 40 of the resistance giving mechanism 34.

As the clamp rod 7 ascends, the wedge surfaces 24 cause the locking members 23 to retract radially inward, and the protruding portions 29 of the locking members 23 are moved radially inward away from the peripheral wall of the hole Wa of the workpiece W.

As the clamp rod 7 ascends further, the tapered surface 7a provided on the outer periphery of the clamp rod 7 comes to abut the inner peripheral edge portion of the upper end portion of the tubular portion 20 of the support member 19. Then the locking members 23 and the support member 19, as well as the clamp rod 7, ascend together against the elastic restoring force of the spring 40. Thereafter, the upper end surface of the tubular portion 20 comes to abut an inner portion of the ceiling surface of the upper housing 5, which stops the ascent of the clamp rod 7, and the apparatus is into the unclamping state shown in FIG. 5.

Figure 8:
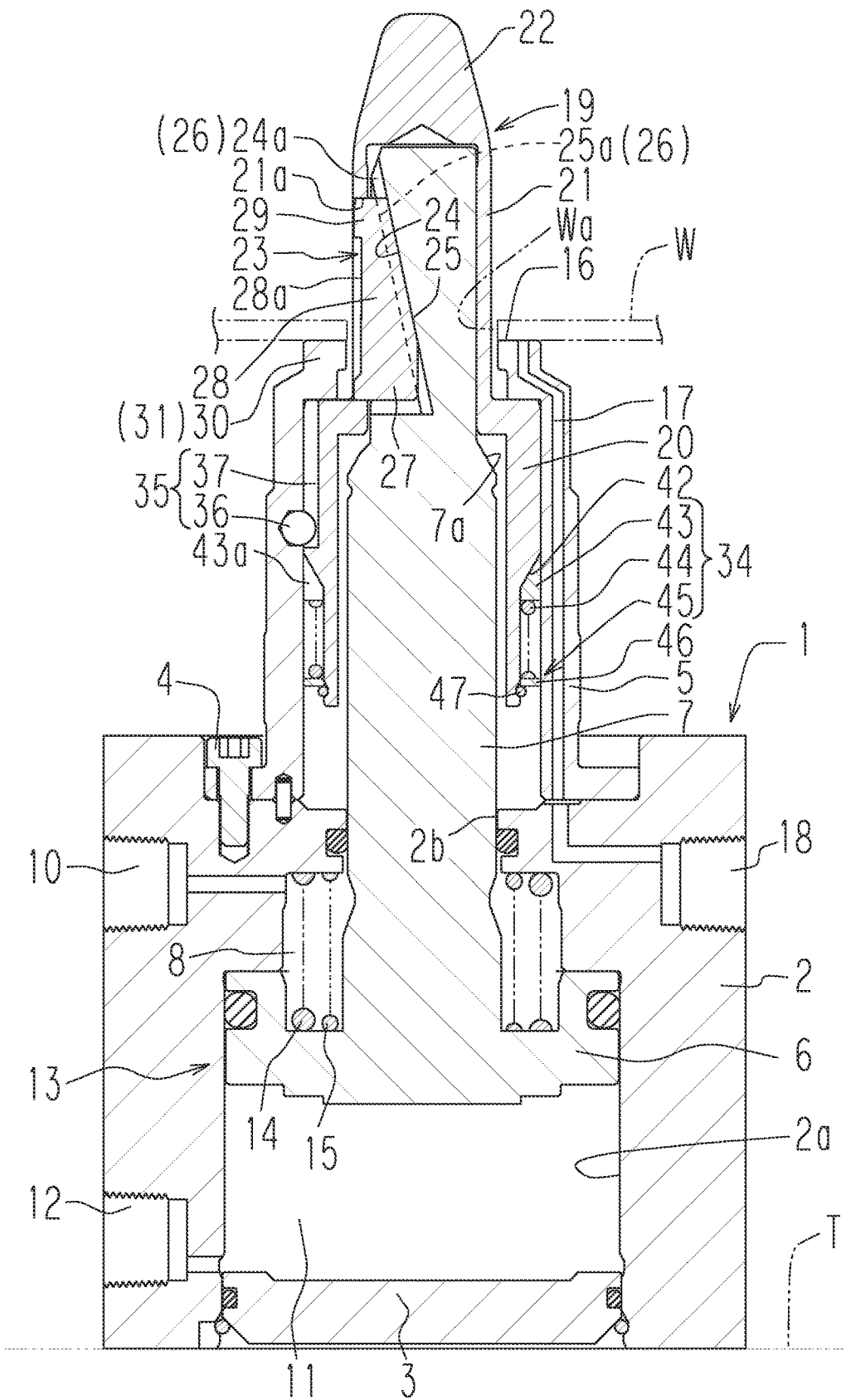
FIG. 8 shows a third embodiment of the present invention, and is an elevational view in section of a clamping apparatus in the unclamping state.
Figure 9:
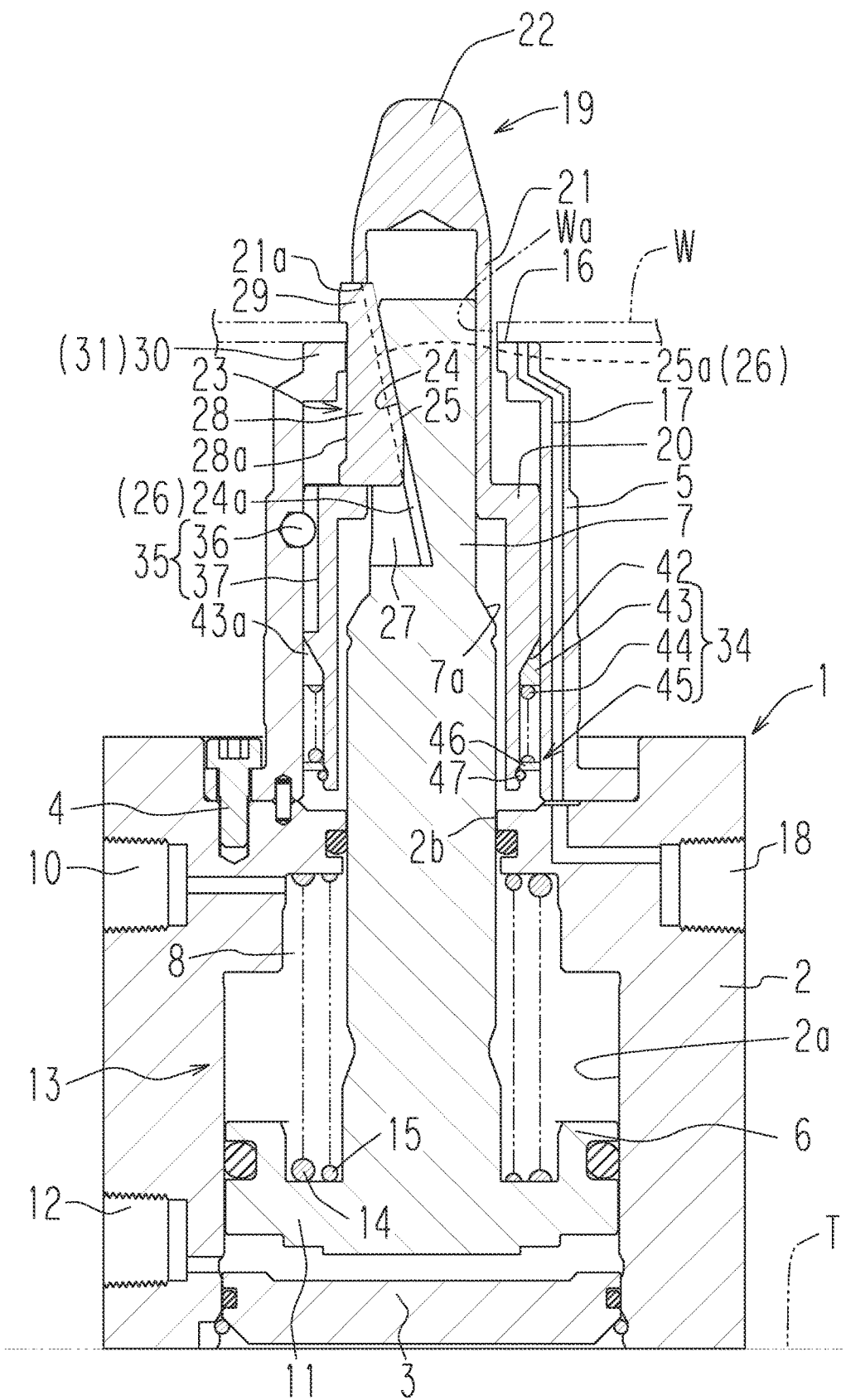
FIG. 9 is an elevational view in section of the clamping apparatus shown in FIG. 8, which is in the clamping state.
Figure 10:
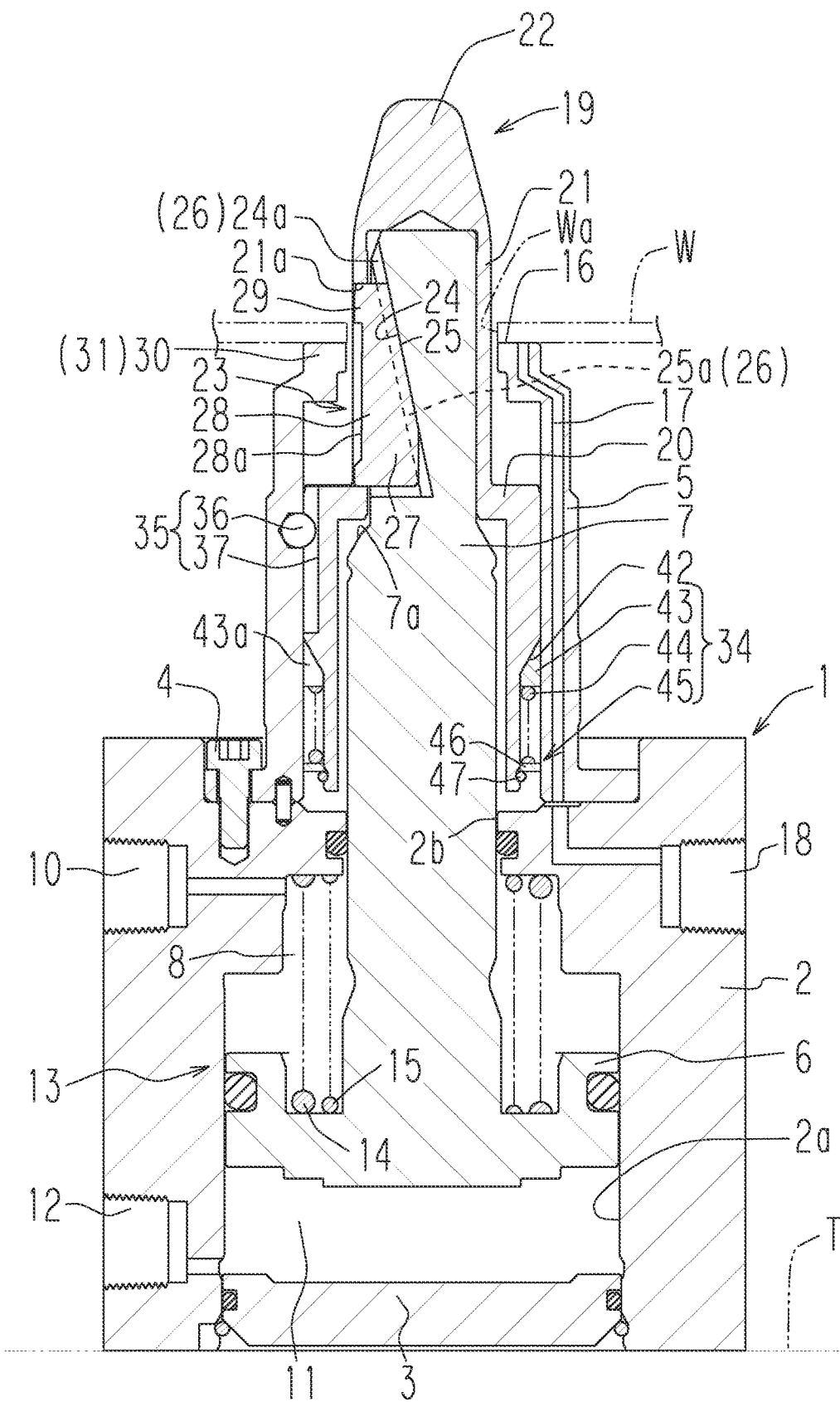
FIG. 10 is an elevational view in section of the clamping apparatus shown in FIG. 8, which is in the course of transition from the clamping state to the unclamping state shown in FIG. 8.

FIG. 8 to FIG. 10 show a third embodiment of the present invention. The following describes a difference between a clamping apparatus of the third embodiment and the clamping apparatus of the first embodiment.

The difference between the third embodiment and the first embodiment is in the structure of the resistance giving mechanism 34. The resistance giving mechanism 34 of the third embodiment is structured as follows.

An inclined surface 42, which is inclined relative to the axial direction, is provided on an outer periphery of the tubular portion 20 of the support member 19. A wedge member 43 engaged with the inclined surface 42 from below is attached between the inclined surface 42 and the inner peripheral surface of the upper housing 5. A spring 44 functioning as a biasing means configured to bias the wedge member 43 upward is held close to the outer peripheral surface of the tubular portion 20 by a holding means 45 constituted by an annular spring receiver 46 and a retaining ring 47. The wedge member 43, the spring 44, and the holding means 45 constitute the resistance giving mechanism 34. The annular wedge member 43 has a slit 43a, and is therefore elastically deformable in the radial direction.

The clamping apparatus of the third embodiment operates as follows in the unclamping action.

Compressed air in the clamp chamber 8 is discharged and compressed air is supplied to the unclamp chamber 11, to raise the piston 6. As a result, the clamp rod 7 ascends first, as shown in FIG. 10. The support member 19 and the locking members 23 are held at their respective positions in the clamping state shown in FIG. 9 (at their respective lowered positions) by the wedge member 43, which radially disperses the biasing force of the spring 44 of the resistance giving mechanism 34.

As the clamp rod 7 ascends, the wedge surfaces 24 cause the locking members 23 to retract radially inward, and the protruding portions 29 of the locking members 23 are moved radially inward away from the peripheral wall of the hole Wa of the workpiece W.

As the clamp rod 7 ascends further, the tapered surface 7a provided on the outer periphery of the clamp rod 7 comes to abut the inner peripheral edge portion of the upper end portion of the tubular portion 20 of the support member 19. Then the locking members 23 and the support member 19, as well as the clamp rod 7, ascend together against the resistance from the wedge member 43. Thereafter, the upper end surface of the tubular portion 20 comes to abut the inner portion of the ceiling surface of the upper housing 5, which stops the ascent of the clamp rod 7, and the apparatus is into the unclamping state shown in FIG. 8.

Figure 11:
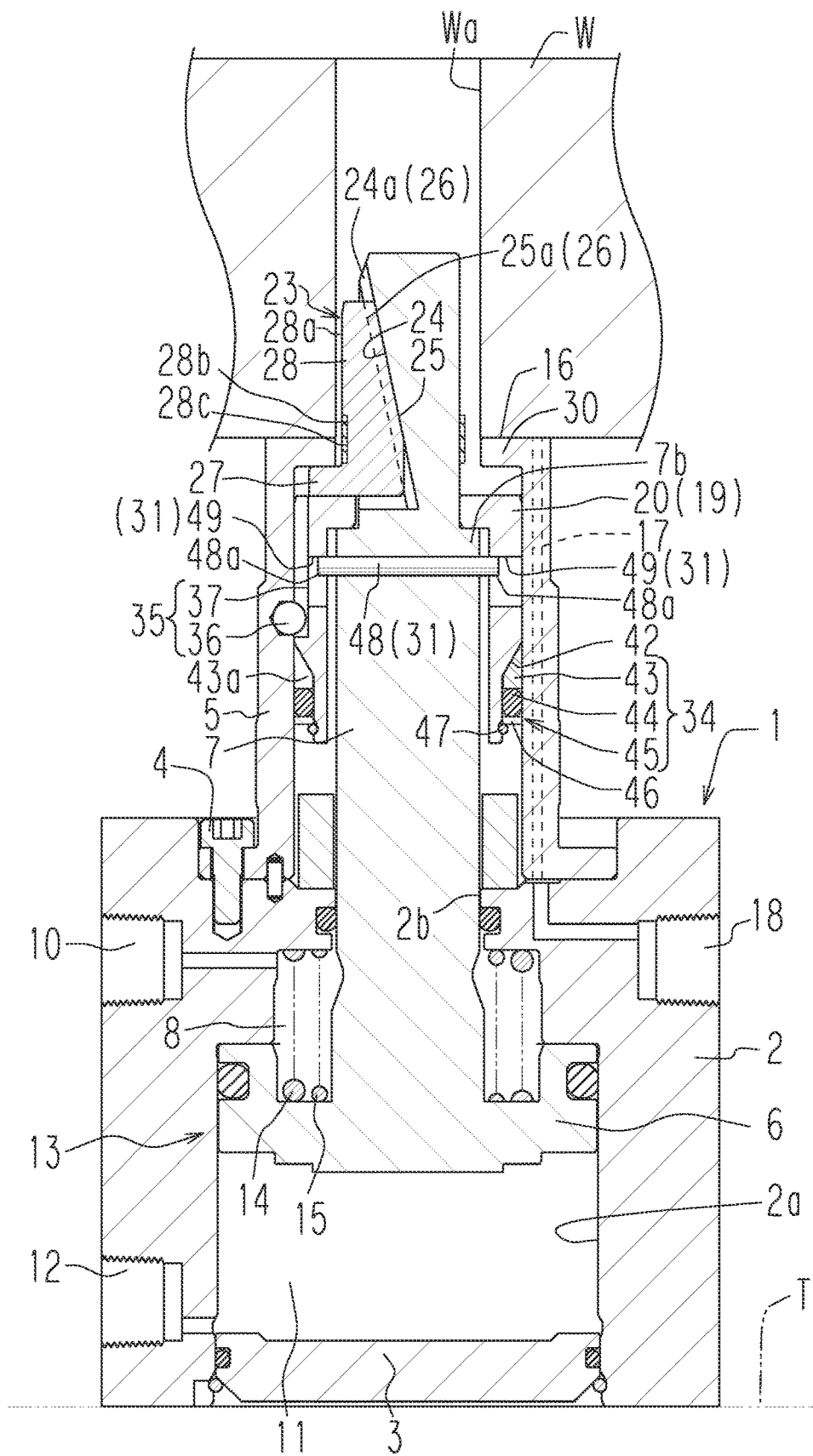
FIG. 11 shows a fourth embodiment of the present invention, and is an elevational view in section of a clamping apparatus in the unclamping state.
Figure 12:
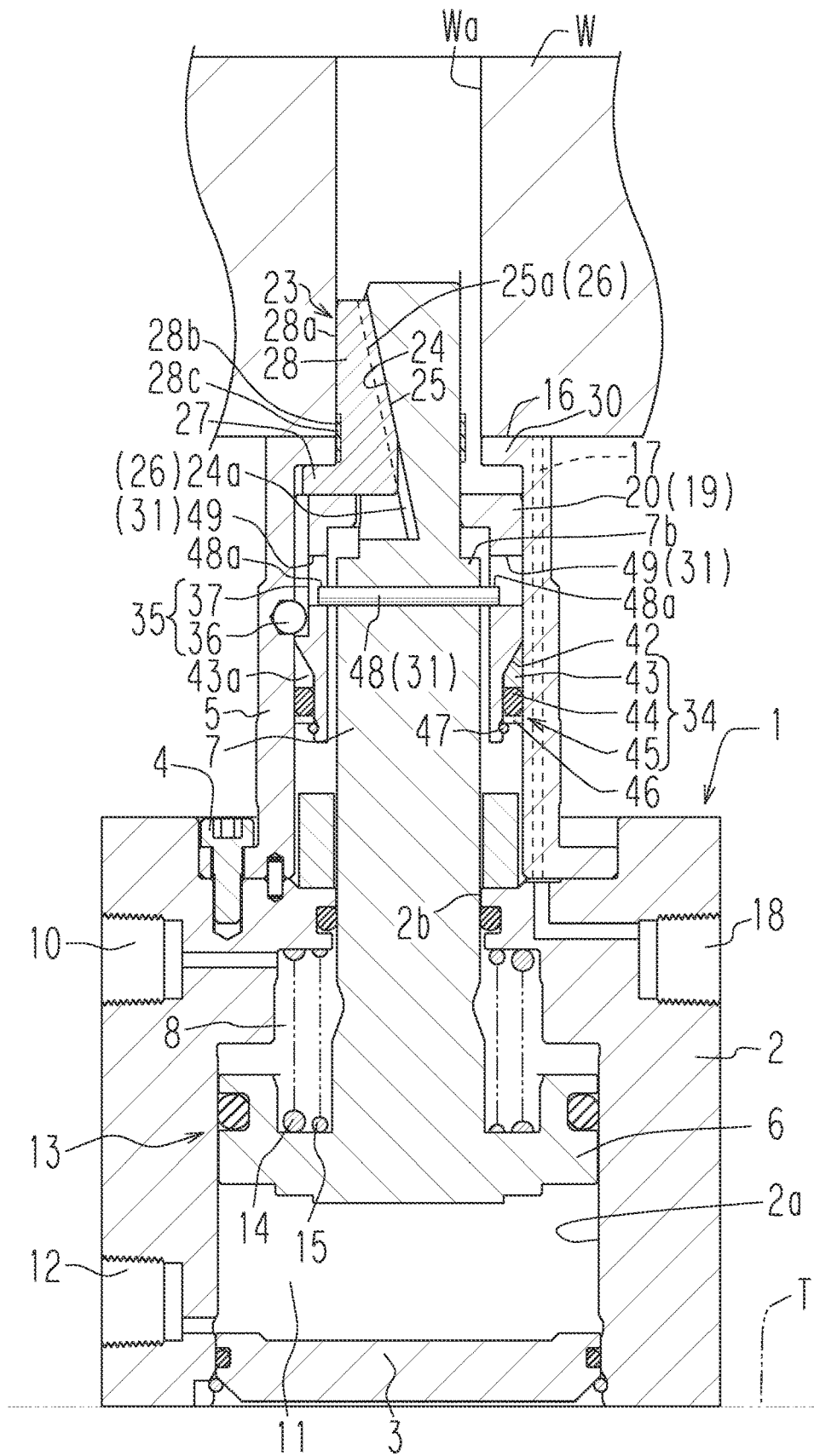
FIG. 12 is an elevational view in section of the clamping apparatus shown in FIG. 11, which is in the clamping state.

FIG. 11 and FIG. 12 show a fourth embodiment of the present invention. The following describes differences between a clamping apparatus of the fourth embodiment and the clamping apparatus of the third embodiment.

The differences between the fourth embodiment and the third embodiment are: in the structure of the support member 19; in the structure of the relative movement restriction mechanism 31; in the structure of the resistance giving mechanism 34; and in the structure of the locking members 23. While the workpiece W (object to be clamped) in each of the first to third embodiments is thin, a workpiece W in the fourth embodiment is thick.

The support member 19 of the fourth embodiment is structured as follows.

Differently from that in the first to third embodiments, the support member 19 in the fourth embodiment has neither the peripheral wall portion 21 nor the top wall portion 22, and is structured only by the tubular portion 20.

The relative movement restriction mechanism 31 of the fourth embodiment is structured as follows. A pin 48 is attached to the clamp rod 7 so as to radially penetrate the clamp rod 7. Elongated holes 49, each elongated in the axial direction (in the up-down direction), are provided in a peripheral wall of the support member 19 (of the tubular portion 20). End portions 48a of the pin 48 are respectively inserted in the elongated holes 49. The pin 48 and the elongated holes 49 constitute the relative movement restriction mechanism 31.

The resistance giving mechanism 34 of the fourth embodiment is structured as follows.

The biasing means of the resistance giving mechanism 34 is constituted by an O ring 44 and compressed air, instead of the spring in the third embodiment. Compressed air supplied from the air supply port 18 not only flows into the detection passage 17, but also flows upward in the upper housing 5. To be more specific, compressed air supplied from the air supply port 18 is also supplied to a cylindrical hollow space of the upper housing 5, through a groove provided between: a bottom surface of a recessed portion at an upper end portion of the lower housing 2; and an under surface of the upper housing 5. Compressed air supplied to the cylindrical hollow space of the upper housing 5 pushes the O ring 44 upward, functioning as one of elements constituting the biasing means. The O ring 44 is attached in a space created between the inner peripheral surface of the upper housing 5 and an outer peripheral surface of a lower portion of the tubular portion 20, so as to push the wedge member 43 upward. The spring receiver 46 of the third embodiment is an O ring receiver in the fourth embodiment. Compressed air does not have to be always supplied into the cylindrical hollow space in the upper housing 5 from its bottom portion if the elastic restoring force of the O ring 44 is large enough. That is, the biasing means of the resistance giving mechanism 34 may be constituted only by the O ring 44. Alternatively, the wedge member 43 may be biased upward only by compressed air supplied into the cylindrical hollow space in the upper housing 5 from its bottom portion, instead of the above arrangement in which the biasing means is constituted only by the elastic restoring force of the O ring 44.

The locking members 23 of the fourth embodiment are structured as follows.

Differently from those in the first to third embodiments, each locking member 23 in this embodiment has no protruding portion 29, and is constituted by the proximal end portion 27 and the base portion 28. Furthermore, an accommodation groove 28b is provided in the circumferential direction on an outer peripheral wall of the base portion 28 of each locking member 23. (It should be noted that FIG. 11 and FIG. 12 each shows only one of the three locking members 23.) A ring-like elastic member 28c is attached in the accommodation grooves 28b of the three locking members 23. The elastic member 28c is made of rubber, resin, or the like. The elastic member 28c biases the three locking members 23 toward the axis of the clamp rod 7. The elastic member 28c is provided to firmly hold the locking members 23 at a leading end portion of the clamp rod 7.

In this embodiment, the outer peripheral surfaces 28a of the base portions 28 are pressed onto the inner peripheral surface of the hole Wa of the workpiece W, to clamp the workpiece W.

The clamping apparatus of the fourth embodiment operates as follows.

To cause the apparatus to transition from the unclamping state shown in FIG. 11 to the clamping state shown in FIG. 12, compressed air in the unclamp chamber 11 is discharged and compressed air is supplied to the clamp chamber 8, to lower the piston 6.

As a result, the clamp rod 7 descends. Due to this, the wedge surfaces 24 of the clamp rod 7 push the locking members 23 radially outward, and the outer peripheral surfaces 28a of the base portions 28 of the locking members 23 push the inner peripheral surface of the hole Wa of the workpiece W. The workpiece W is thus clamped. When the clamp rod 7 is lowered, the end portions 48a of the pin 48 is brought into contact with respective bottom surfaces of the elongated holes 49, and the support member 19 and the locking members 23 descend slightly. The contact of the end portions 48a of the pin 48 with the respective bottom surfaces of the elongated holes 49 prevents the locking members 23 from moving further radially outward.

In the clamping state shown in FIG. 12, the detection passage 17 is closed by an under surface of the workpiece W. Due to this, the pressure of pressurized air supplied to the detection passage 17 to detect the workpiece becomes higher than a set pressure. Such an increase in pressure is detected by a pressure switch or the like, to confirm that the workpiece W has been clamped.

To cause the apparatus to transition from the clamping state shown in FIG. 12 to the unclamping state shown in FIG. 11, compressed air in the clamp chamber 8 is discharged and compressed air is supplied to the unclamp chamber 11, to raise the piston 6.

As a result, the clamp rod 7 ascends first. The support member 19 and the locking members 23 are held at their respective positions in the clamping state (at their respective lowered positions) by the wedge member 43, which radially disperses the biasing force of the O ring 44 of the resistance giving mechanism 34.

As the clamp rod 7 ascends, the wedge surfaces 24 cause the locking members 23 to retract radially inward, and the outer peripheral surfaces 28a of the base portions 28 of the locking members 23 move radially inward away from the inner peripheral surface of the hole Wa of the workpiece W.

As the clamp rod 7 ascends further, a stepped portion 7b of an upper portion of the clamp rod 7 comes to abut the inner peripheral edge portion of the upper end portion of the support member 19, or the end portions 48a of the pin 48 come to abut respective ceiling surfaces of the elongated holes 49. Then the locking members 23 and the support member 19, as well as the clamp rod 7, ascend together against the resistance from the wedge member 43. Thereafter the ascent of the clamp rod 7 stops, and the apparatus is into the unclamping state shown in FIG. 11.

FIG. 13A to FIG. 15 show a fifth embodiment of the present invention. The following describes differences between a clamping apparatus of the fifth embodiment and the clamping apparatus of the first embodiment.

Main differences between the fifth embodiment and the first embodiment is in the structure of the housing 1 and in the structure of the clamp rod 7.

The housing 1 of the fifth embodiment is structured as follows. The housing 1 includes the tubular upper housing 5 connected to the top surface of the lower housing 2. The upper housing 5 is movable in its radial direction (in the horizontal direction in this embodiment). The upper housing 5 has a flange portion 5b provided at a base end portion of the upper housing 5 and extending radially outward. An annular upper housing holding member 51 facing the flange portion 5b from the leading end side is fixed to the top surface of the lower housing 2 with the bolt 4. Because of this configuration, the upper housing 5 is connected to the lower housing 2 so as to movable in its radial direction relative to the lower housing 2.

The clamp rod 7 of the fifth embodiment is structured as follows. The clamp rod 7 includes: a rod main body 52 protruding upward from the piston 6; and a rod leading end portion 54 connected to a leading end portion of the rod main body 52 via a pin 53 so as to be movable in the radial direction of the rod main body 52. The rod leading end portion 54 has, at its base end portion, an elongated hole 54b. The pin 53 is inserted in the elongated hole 54b. The wedge surfaces 24 are provided on the rod leading end portion 54. Because the hole 54b in which the pin 53 is inserted has an elongated shape, the rod leading end portion 54 is movable relative to the rod main body 52 not only in the axial direction of the pin 53 but also in directions oblique relative to the axial direction. The hole, which is provided through the base end portion of the rod leading end portion 54 and in which the pin 53 is inserted, may be a hole of a perfect circle with a diameter slightly larger than an outer diameter of the pin 53, instead of the elongated hole 54b.

In the fifth embodiment, no detection passage 17 is provided in the upper housing 5. Compressed air supplied from the air supply port 18 passes through the inside of the lower housing 2, flows upward through an annular gap between the outer peripheral surface of the tubular portion 20 of the support member 19 and the inner peripheral surface of the upper housing 5, and is ejected to the outside. This compressed air functions as "blow-off air". Furthermore, neither the spring 15 nor the straight-movement guiding mechanism 35 (the ball 36 and the straight-movement guiding groove 37) are provided in the fifth embodiment.

In the first embodiment, the resistance giving mechanism 34 (the annular groove 32 and the retaining ring 33) are provided on the outer peripheral surface of the lower end portion of the tubular portion 20. To the contrary, in the fifth embodiment, the resistance giving mechanism 34 (the annular groove 32 and the retaining ring 33) are provided on an outer peripheral surface of an upper end portion of the tubular portion 20. The resistance giving mechanism 34 (the annular groove 32 and the retaining ring 33) may be provided on an outer peripheral surface of a part of the tubular portion 20, which is other than its upper or lower end portion. For example, the mechanism 34 may be provided on an outer peripheral surface of an axially central portion of the tubular portion 20.

Figure 13A:
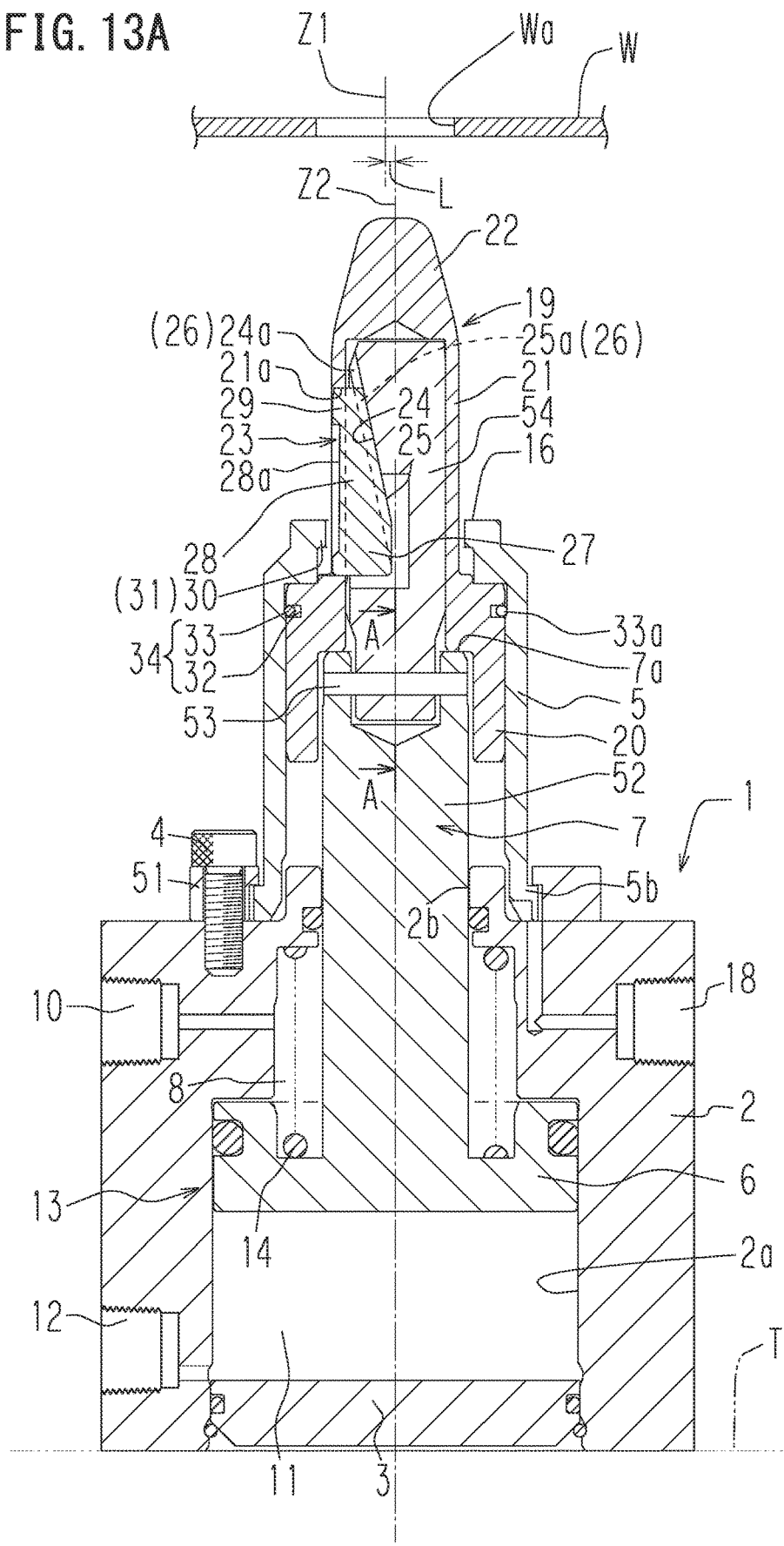
FIG. 13A shows a fifth embodiment of the present invention, and is an elevational view in section of a clamping apparatus, toward which a to-be-clamped object having a hole misaligned in a horizontal direction has not been lowered yet.
Figure 13B:
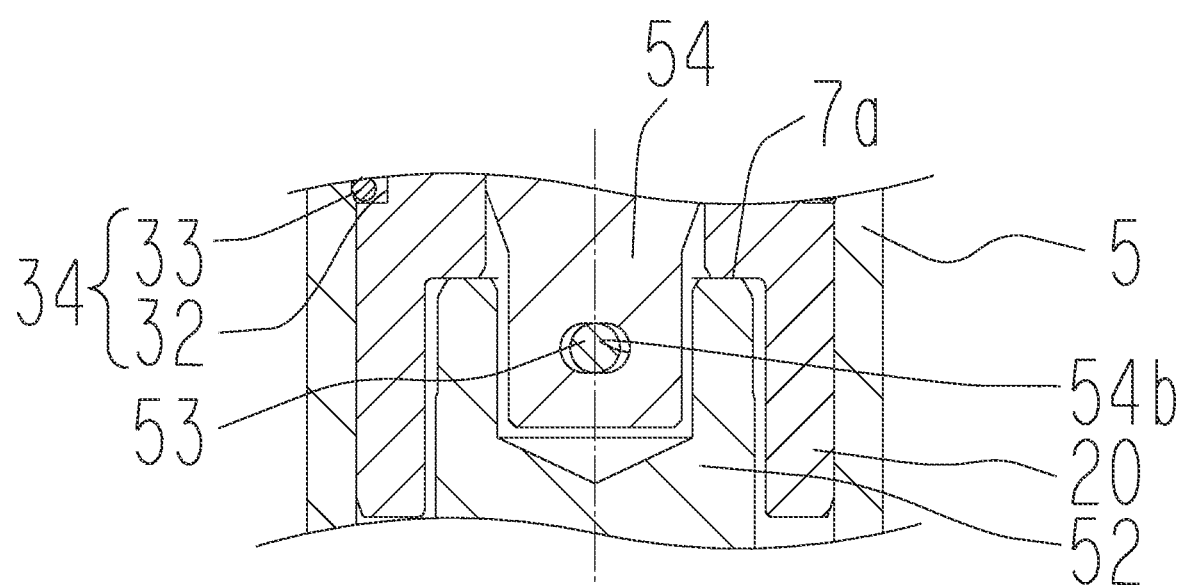
FIG. 13B is a cross section taken along a line A-A in FIG. 13A.

The clamping apparatus of the fifth embodiment operates as follows, when a workpiece W with a hole Wa misaligned in the horizontal direction is lowered in order that the hole Wa is fitted over the support member 19. Suppose that, as shown in FIG. 13A and FIG. 14, a central axis Z1 of the hole Wa is misaligned with a central axis Z2 of the upper housing 5 by a distance L in a horizontal direction parallel to the axial direction of the pin 53, for example.

Figure 14:
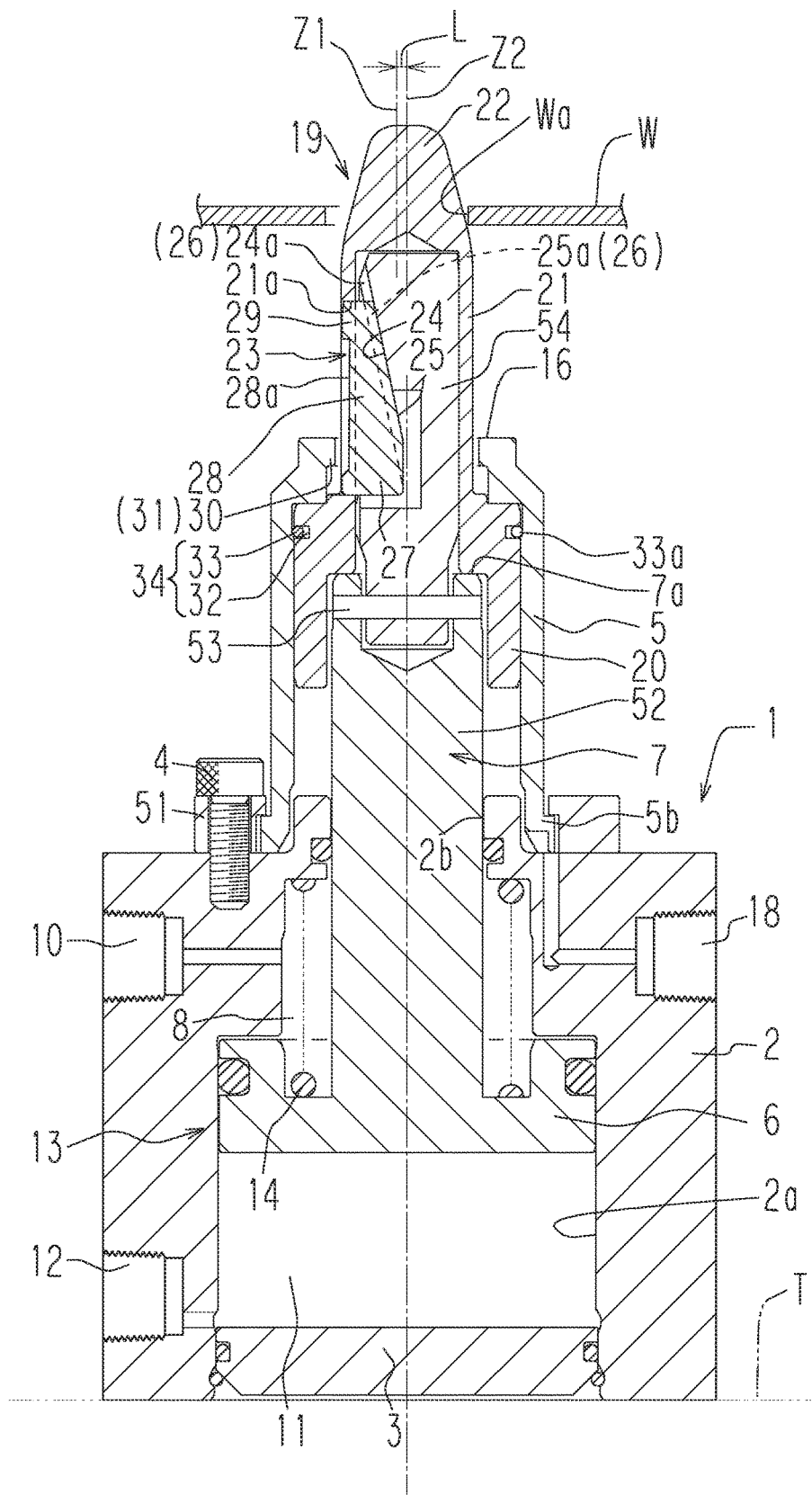
FIG. 14 is an elevational view in section of the clamping apparatus in the following situation: the object shown in FIG. 13A has been lowered; and a lower edge portion of the hole of the object is brought into contact with a side surface of a top wall portion of a support member.
Figure 15:
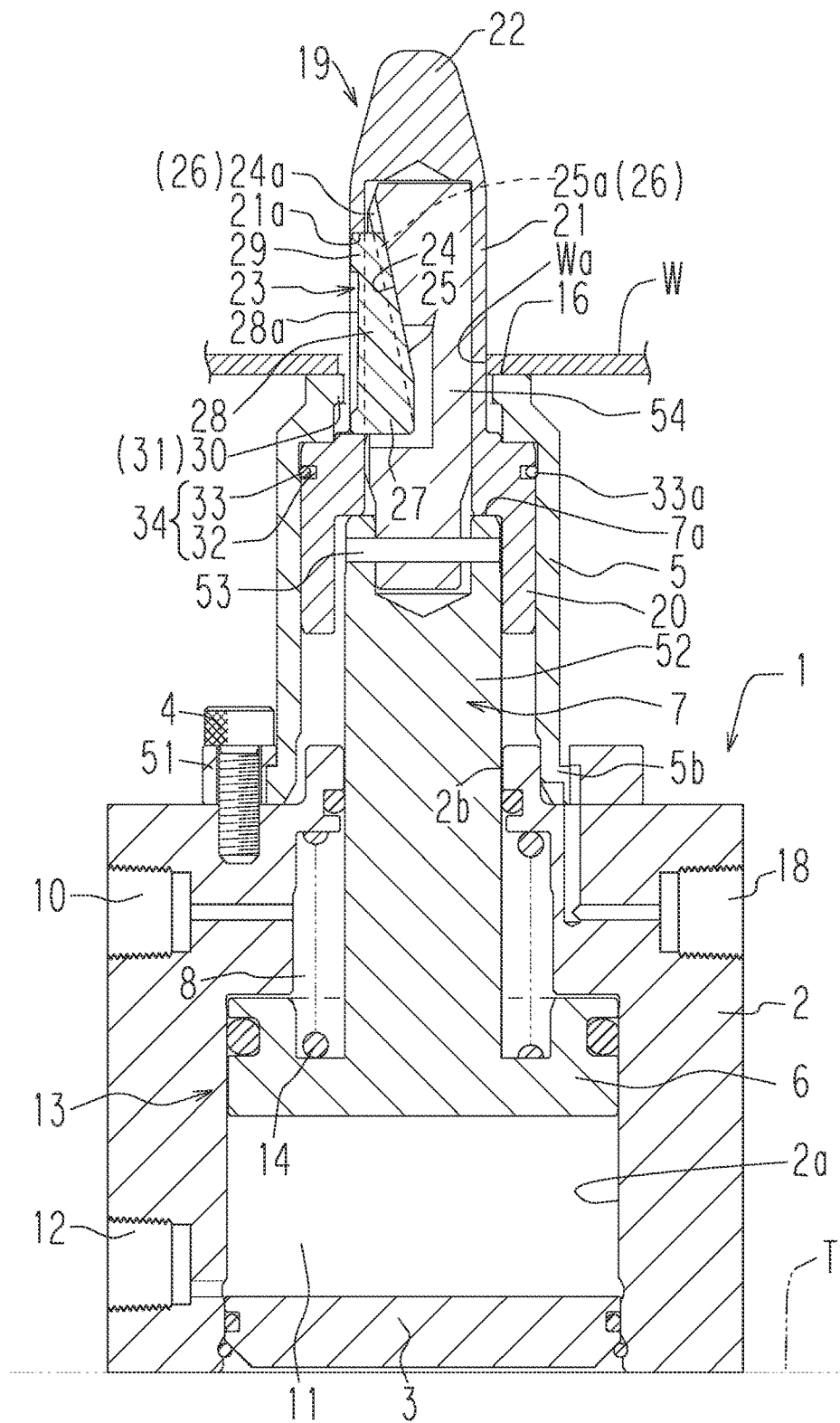
FIG. 15 is an elevational view in section of the clamping apparatus, to which the object shown in FIG. 14 has been further lowered.

As the workpiece W is lowered, a lower edge portion of the hole Wa of the workpiece W comes from above into contact with a side surface of the tapered top wall portion 22, which is a leading end portion of the support member 19, as shown in FIG. 14. As the workpiece W is lowered further, the lower edge portion of the hole Wa pushes the top wall portion 22, and as shown in FIG. 15, the support member 19, the rod leading end portion 54 of the clamp rod 7, the locking members 23 engaged with the rod leading end portion 54, and the upper housing 5 are moved in the horizontal direction such that the above distance L decreases. The hole Wa of the workpiece W is then fitted over the peripheral wall portion 21 of the support member 19.

Subsequent operations in the clamping and unclamping action are similar to those of the clamping apparatus of the first embodiment.

The thus configured clamping apparatus of the fifth embodiment makes it possible to preferably fit a hole Wa of a workpiece W, which is slightly misaligned in the horizontal direction, over the peripheral wall portion 21 of the support member 19.

Figure 16:
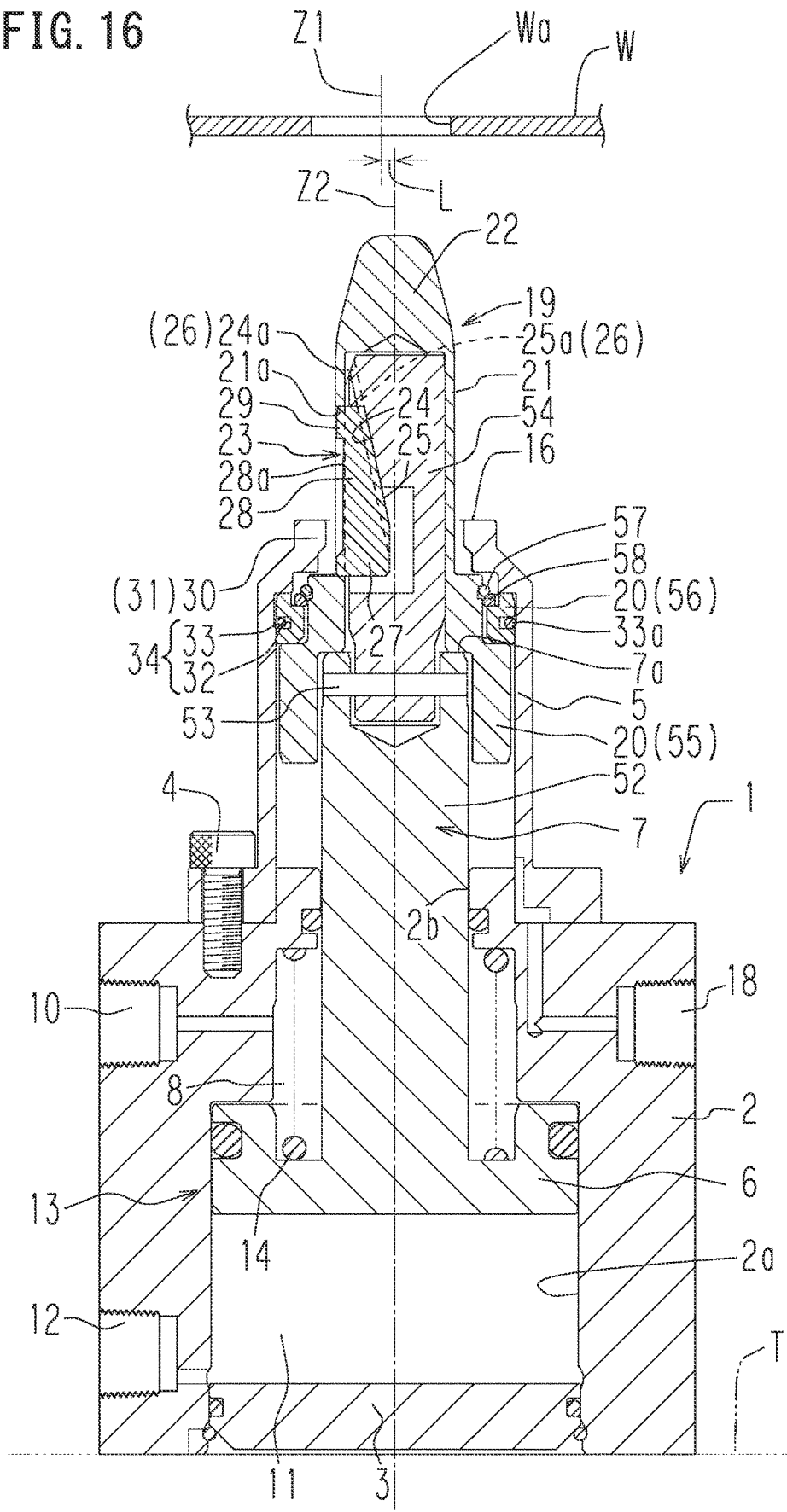
FIG. 16 shows a sixth embodiment of the present invention, and is an elevational view in section of a clamping apparatus, toward which a to-be-clamped object having a hole misaligned in the horizontal direction has not been lowered yet.
Figure 17:
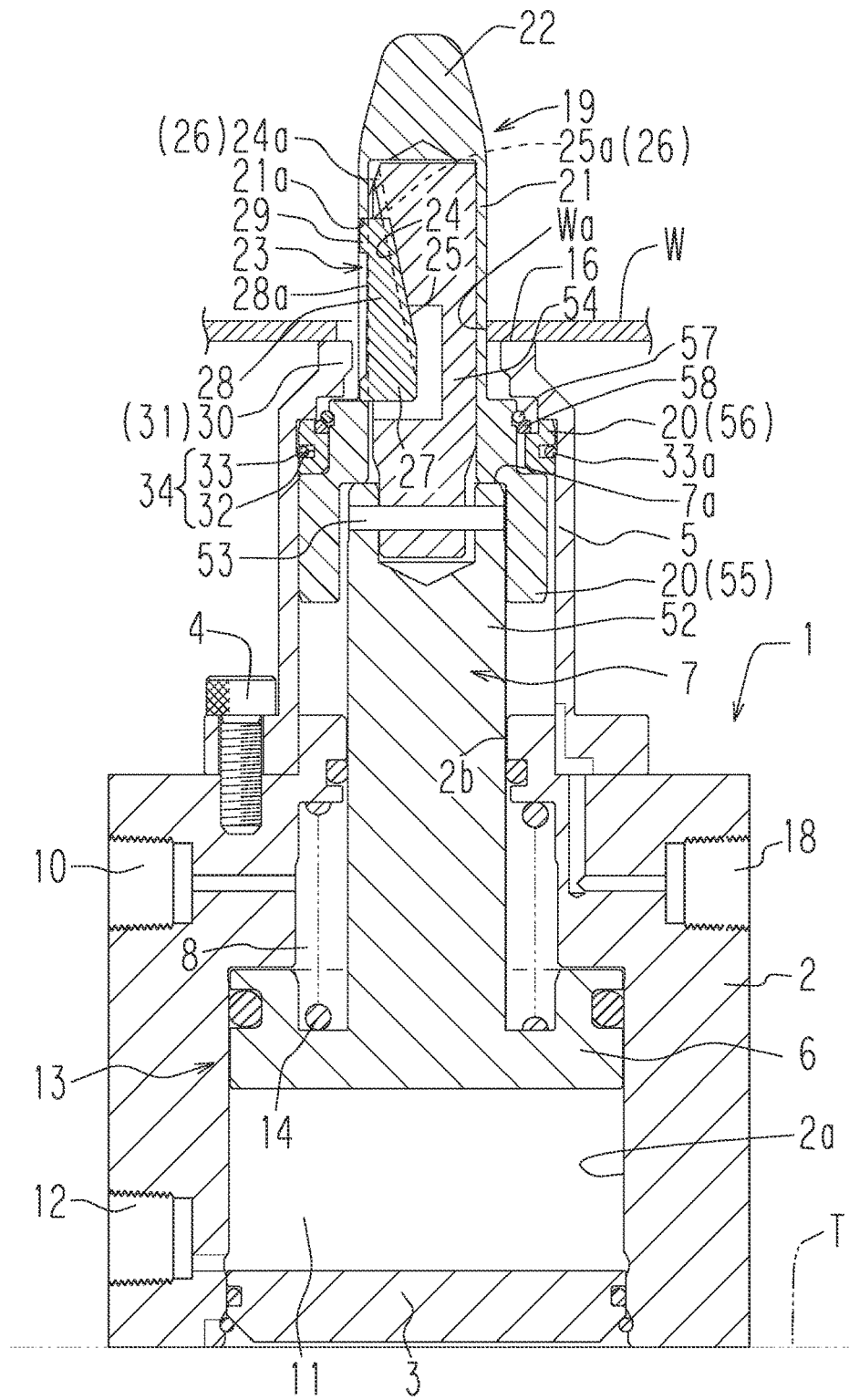
FIG. 17 is an elevational view in section of the clamping apparatus, to which the object shown in FIG. 16 has been lowered, and is a diagram corresponding to FIG. 15.

FIG. 16 and FIG. 17 show a sixth embodiment of the present invention. The following describes differences between a clamping apparatus of the sixth embodiment and the clamping apparatus of the fifth embodiment.

The differences between the sixth embodiment and the fifth embodiment is in the structure of the housing 1 and in the structure of the tubular portion 20 of the support member 19.

Similarly to the upper housing 5 of the first embodiment, the upper housing 5 of the housing 1 of the sixth embodiment is fixed to the top surface of the lower housing 2 with the bolt 4, and is not movable relative to the lower housing 2.

The tubular portion 20 of the sixth embodiment includes: a main tubular portion 55 and an annular resistance giving mechanism holder 56. The resistance giving mechanism holder 56 is attached to an outer peripheral surface of the main tubular portion 55 by a retaining ring 57 and a ring member 58. The main tubular portion 55 (a part of the support member 19 excluding the resistance giving mechanism holder 56) is configured to be movable in its radial direction relative to the resistance giving mechanism holder 56 and to the upper housing 5.

The clamping apparatus of the sixth embodiment operates as follows, when a workpiece W with a hole Wa misaligned in the horizontal direction is lowered in order that the hole Wa is fitted over the support member 19. Suppose that, as shown in FIG. 16, the central axis Z1 of the hole Wa is misaligned with the central axis Z2 of the upper housing 5 by a distance L in the horizontal direction parallel to the axial direction of the pin 53, for example.

As the workpiece W is lowered, the lower edge portion of the hole Wa pushes the top wall portion 22, and as shown in FIG. 17, the part of the support member 19 excluding the resistance giving mechanism holder 56, the rod leading end portion 54 of the clamp rod 7, and the locking members 23 engaged with the rod leading end portion 54 are moved in the horizontal direction such that the above distance L decreases. The hole Wa of the workpiece W is then fitted over the peripheral wall portion 21 of the support member 19.

The thus configured clamping apparatus of the sixth embodiment makes it possible to preferably fit a hole Wa of a workpiece W, which is slightly misaligned in the horizontal direction, over the peripheral wall portion 21 of the support member 19.

Figure 18:
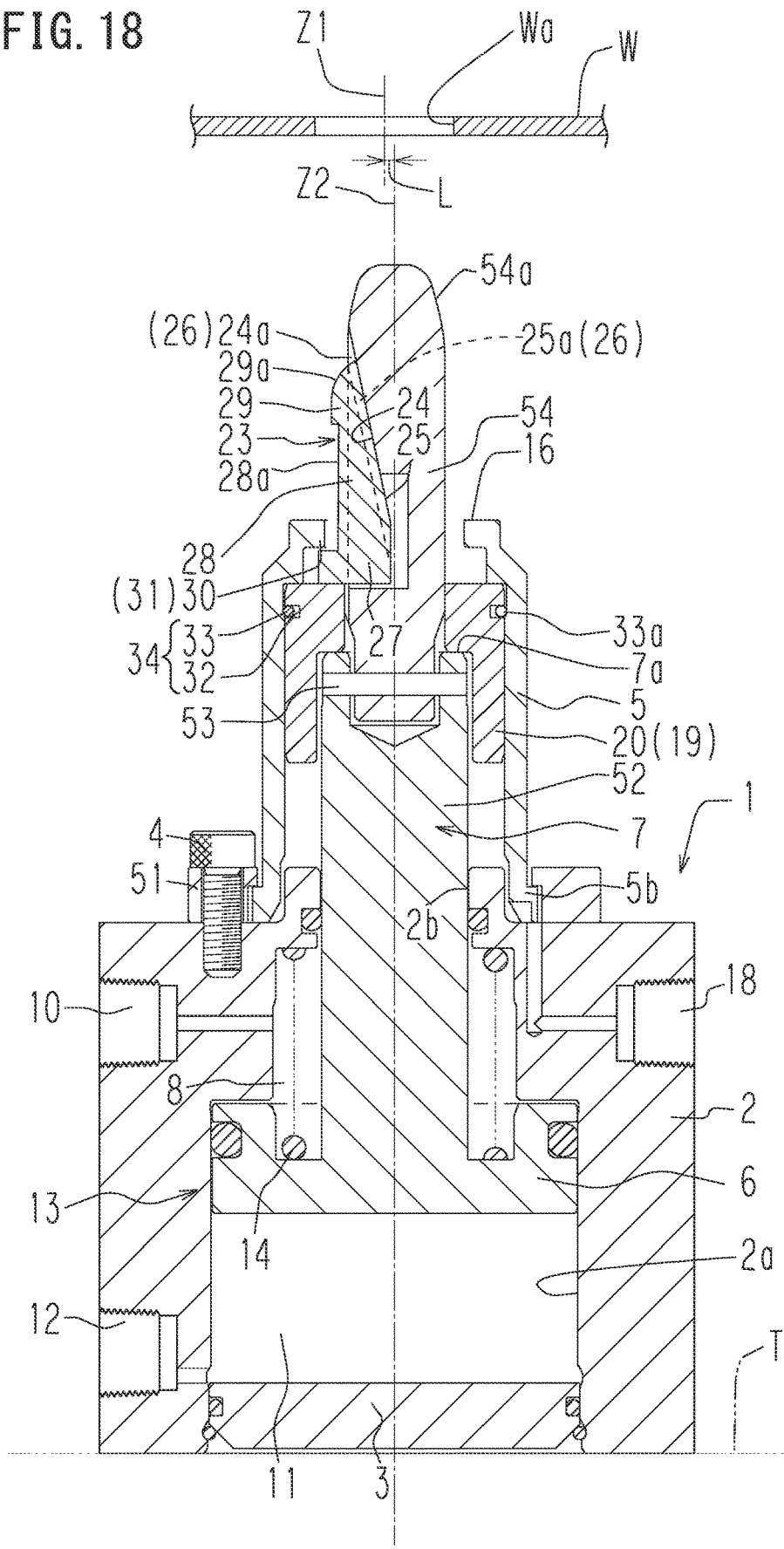
FIG. 18 shows a seventh embodiment of the present invention, and is an elevational view in section of a clamping apparatus, toward which a to-be-clamped object having a hole misaligned in the horizontal direction has not been lowered yet.

FIG. 18 shows a seventh embodiment of the present invention. The following describes differences between a clamping apparatus of the seventh embodiment and the clamping apparatus of the fifth embodiment.

The differences between the seventh embodiment and the fifth embodiment are: in the structure of the support member 19; in the structure of the rod leading end portion 54 of the clamp rod 7; and in the structure of the protruding portion 29 of each locking member 23.

Differently from that in the fifth embodiment, the support member 19 in the seventh embodiment has neither the peripheral wall portion 21 nor the top wall portion 22, and is structured only by the tubular portion 20.

The rod leading end portion 54 of the clamp rod 7 of the seventh embodiment has a leading end portion 54a tapered down toward the leading end of the rod. The protruding portion 29 of each locking member 23 has a leading end portion 29a, which is also tapered down toward the leading end.

As a workpiece W is lowered, a lower edge portion of a hole Wa pushes the leading end portion 54a, and therefore the support member 19, the rod leading end portion 54 of the clamp rod 7, the locking members 23 engaged with the rod leading end portion 54, and the upper housing 5 are moved in the horizontal direction such that the distance L decreases.

Figure 19:
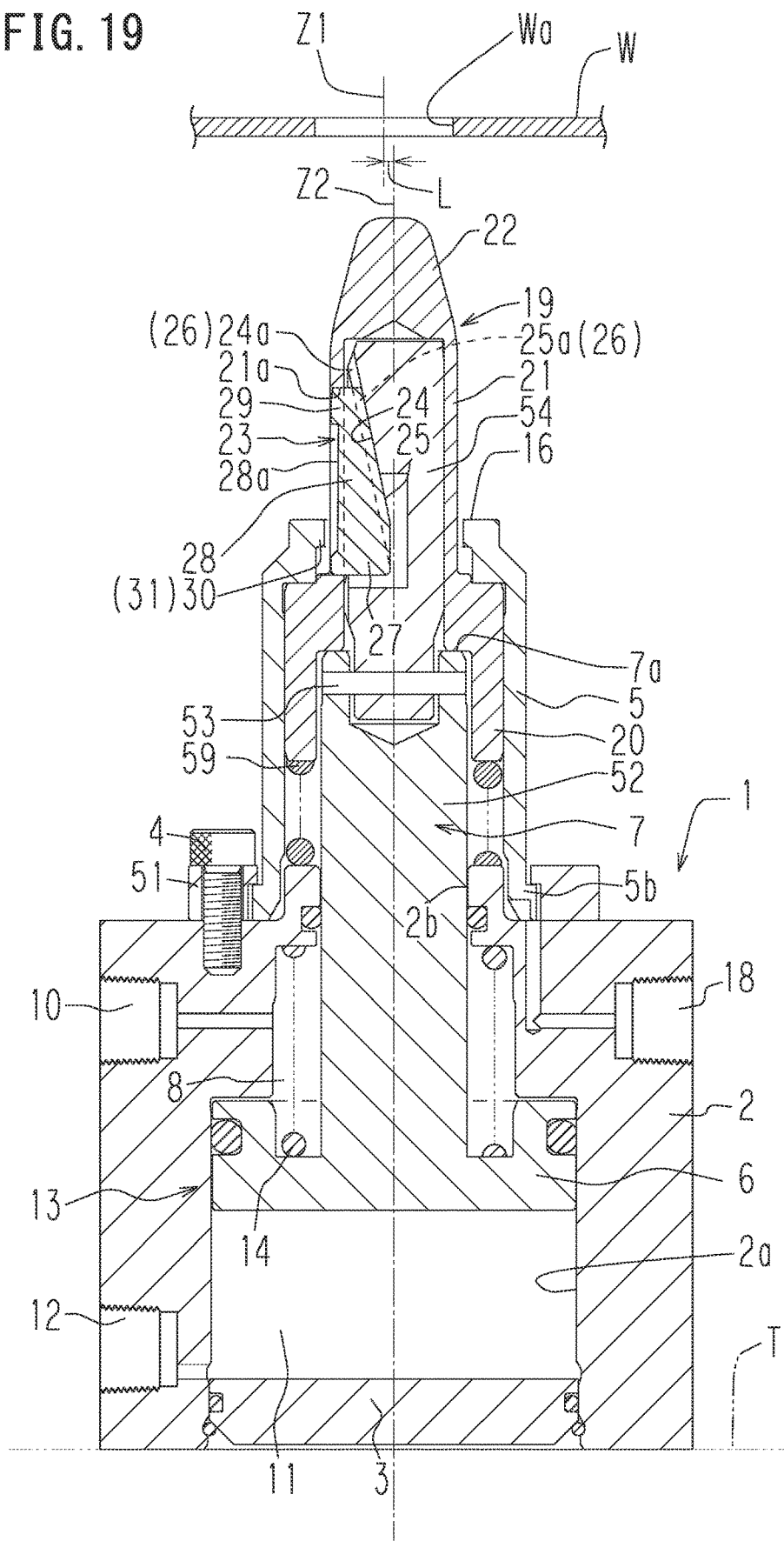
FIG. 19 shows an eighth embodiment of the present invention, and is an elevational view in section of a clamping apparatus, toward which a to-be-clamped object having a hole misaligned in the horizontal direction has not been lowered yet.

FIG. 19 shows an eighth embodiment of the present invention. The following describes differences between a clamping apparatus of the eighth embodiment and the clamping apparatus of the fifth embodiment.

In the eighth embodiment, no resistance giving mechanism 34 is provided. Furthermore, in the eighth embodiment, a spring 59 functioning as a biasing means configured to bias the support member 19 toward the leading end side is housed in the upper housing 5.

The above-described embodiments are changeable as follows.

Operating fluid used for the driving means 13 may be liquid such as pressurized oil, instead of compressed air. The driving means 13 may be of a single-acting type such as a spring-releasing type and a spring-locking type, instead of the double-acting type, which has been described by way of example. Furthermore, the driving means 13 may be structured by another actuator such as an electrical actuator, instead of the fluid actuator described by way of example.

The two springs 14 and 15 are disposed in the clamp chamber 8. The number of springs disposed in the clamp chamber 8 may be one as in the fifth and sixth embodiments. Alternatively, no spring may be disposed in the clamp chamber 8.

The number of locking members 23 may be two or four or more, instead of three. Alternatively, an annular collet having one or more slits may be used to act as a locking member.

The engagement maintaining mechanism 26 may be arranged as follows: instead of the locking-member-side engagement portion 25a, a locking-member-side engagement groove of a groove-like shape may be provided on the inclined surface 25 of each locking member 23; and instead of the rod-side engagement groove 24a, a rod-side engagement portion configured to be fitted in the locking-member-side engagement groove may be provided on each wedge surface 24 of the clamp rod 7.

Furthermore, it is possible to arrange the mechanism as follows: the locking-member-side engagement portion 25a and the rod-side engagement groove 24a are not provided; and an annular elastic member is fitted over an upper end portion of the clamp rod 7 provided with the wedge surfaces 24 and over the locking members 23, to maintain the engagement between the wedge surfaces 24 of the clamp rod 7 and the respective locking members 23. For example, the following configuration is possible: the accommodation groove 28b is provided on the outer peripheral wall of each base portion 28 similarly to the locking members 23 of the fourth embodiment shown in FIG. 11 and FIG. 12; and the annular elastic member 28c functioning as the above-mentioned elastic member is fitted in the accommodation grooves 28b, to maintain the engagement between the wedge surfaces 24 of the clamp rod 7 and the respective locking members 23.

For the resistance giving mechanism 34 in the first and fifth to seventh embodiments, an elastic member such as an O ring may be used instead of the retaining ring 33.

In the description of the operation at the time of the unclamping action in the first to third embodiments, the tapered surface 7a provided on the outer periphery of the clamp rod 7 comes to abut the inner peripheral edge portion of the upper end portion of the tubular portion 20 of the support member 19, and consequently the locking members 23 and the support member 19, as well as the clamp rod 7, ascend together. Instead of this, the apparatus may be arranged so that: the locking members 23 and the support member 19, as well as the clamp rod, 7 ascend together by causing an upper end surface of the clamp rod 7 to abut an inner wall surface of the top wall portion 22 of the support member 19 to lift up the support member 19.

Instead of the support member 19 of the clamping apparatuses of the first to third embodiments, there may be used the support member 19 in the fourth or seventh embodiment, which has neither the peripheral wall portion 21 nor the top wall portion 22 and is structured only by the tubular portion 20.

Instead of the relative movement restriction mechanism 31 of the clamping apparatus of each of the first to third embodiments, there may be used the relative movement restriction mechanism 31 of the clamping apparatus of the fourth embodiment. Instead of the relative movement restriction mechanism 31 of the clamping apparatus of the fourth embodiment, there may be used the relative movement restriction mechanism 31 of the clamping apparatus of each of the first to third embodiments.

The resistance giving mechanism 34 of the clamping apparatus of the fourth embodiment may be used in the clamping apparatus of the first embodiment. Furthermore, the resistance giving mechanism 34 of the clamping apparatus of each of the first to third embodiments may be used in the clamping apparatus of the fourth embodiment. Furthermore, the resistance giving mechanism 34 of the clamping apparatus of each of the second to fourth embodiments may be used in each of the clamping apparatuses of the fifth and seventh embodiments.

In the clamping apparatus of the eighth embodiment, the support member 19 may be biased upward (toward the leading end side) by the pressure of pressure fluid supplied to a fluid chamber provided below the support member 19, instead of being biased upward by the spring 59.

Instead of the upright or vertical position as illustrated by way of example, the clamping apparatus of the present invention may be placed in an upside-down position, a horizontal position, or a tilted position.

It is a matter of course that other changes or alterations can be made on the present invention within the scope of envisagement of one skilled in the art.

REFERENCE SIGNS LIST

1: housing; 2: lower housing; 5: upper housing; 7: clamp rod; 13: driving means; 19: support member; 20: tubular portion; 21: peripheral wall portion; 21a: guide hole 22: top wall portion; 23: locking member; 24: wedge surface; 24a: rod-side engagement groove; 25a: locking-member-side engagement portion; 26: engagement maintaining mechanism; 30: protrusion; 31: relative movement restriction mechanism; 32: annular groove; 33: retaining ring (elastic member); 34: resistance giving mechanism; 38: lateral hole; 39: ball (engagement member); 40: spring (biasing means); 42: inclined surface; 43: wedge member; 44: spring (biasing means); 45: holding means; 52: rod main body; 53: pin; 54: rod leading end portion; W: workpiece (to-be-clamped object); Wa: hole.

The invention claimed is:

1. A clamping apparatus comprising:
a housing (1);
a locking member (23) protruding toward a leading end side relative to the housing (1) and configured to be insertable into a hole (Wa) of a to-be-clamped object (W);
a clamp rod (7) including a wedge surface (24) configured to be engaged with the locking member (23) from the leading end side;
a driving means (13) configured to drive the clamp rod (7) toward a base end side for clamping action and to drive the clamp rod (7) toward the leading end side for unclamping action;
a support member (19) supporting a base end portion of the locking member (23) so that the locking member (23) is radially movable, the support member (19) being inserted in a leading-end-side portion of the housing (1) so as to be movable in an axial direction of the housing;
a resistance giving mechanism (34) configured to give resistance to axial movement of the support member (19) with respect to both directions toward the leading end side and toward the base end side; and
an engagement maintaining mechanism (26) which allows the wedge surface (24) of the clamp rod (7) to be engaged with the locking member (23) so as to be movable relative to each other, wherein
when the clamp rod (7) is driven toward the leading end side for unclamping action, the clamp rod (7) moves the locking member (23) toward the leading end side via the support member (19) after the locking member (23) moves radially inward.

2. The clamping apparatus according to claim 1, wherein the support member (19) includes a tubular portion (20) in which the clamp rod (7) is inserted so as to be movable in the axial direction, and wherein
the resistance giving mechanism (34) includes:
an annular groove (32) provided on an outer peripheral surface of the tubular portion (20); and
a ring-shaped elastic member (33) attached to the annular groove (32).

3. The clamping apparatus according to claim 1, wherein the support member (19) includes a tubular portion (20) in which the clamp rod (7) is inserted so as to be movable in the axial direction, and wherein
the resistance giving mechanism (34) includes:
a lateral hole (38) bored in a side wall of a leading-end-side portion of the housing (1); and
an engagement member (39) and a biasing means (40) which are attached in the lateral hole (38), the biasing means (40) being configured to bias the engagement member (39) toward the tubular portion (20).

4. The clamping apparatus according to claim 1, wherein the support member (19) includes a tubular portion (20) in which the clamp rod (7) is inserted so as to be movable in the axial direction, and wherein
the resistance giving mechanism (34) includes:
a wedge member (43) engaged from the base end side with an inclined surface (42) provided on an outer periphery of the tubular portion (20) and inclined relative to the axial direction, the wedge member (43) being attached between the inclined surface (42) and an inner peripheral surface of the housing (1);
a biasing means (44) configured to bias the wedge member (43) toward the leading end side; and
a holding means (45) holding the biasing means (44) close to an outer peripheral surface of the tubular portion (20).

5. The clamping apparatus according to claim 1, wherein the engagement maintaining mechanism (26) includes:
a rod-side engagement groove (24a) or rod-side engagement portion provided on the wedge surface (24) of the clamp rod (7); and
a locking-member-side engagement portion (25a) provided on the locking member (23), the locking-member-side engagement portion (25a) being configured to engage with the rod-side engagement groove (24a) or a locking-member-side engagement groove.

6. The clamping apparatus according to claim 1, further comprising
a relative movement restriction mechanism (31) configured to restrict radially outward movement of the locking member (23) relative to the clamp rod (7) within a predetermined range when the clamp rod (7) is driven toward the base end side for clamping action.

7. The clamping apparatus according to claim 6, wherein the relative movement restriction mechanism (31) is an annular protrusion (30) provided at a leading-end-side end portion of the housing (1) and protruding radially inward, and a hole in the annular protrusion (30) has a diameter equal to or smaller than a diameter of the hole (Wa) of the to-be-clamped object (W).

8. The clamping apparatus according to claim 1, wherein the support member (19) includes:
a tubular portion (20) in which the clamp rod (7) is inserted so as to be movable in the axial direction;
a peripheral wall portion (21) provided on the leading end side relative to the tubular portion (20), the peripheral wall portion (21) having a guide hole (21a) in which the locking member (23) is inserted so as to be radially movable; and
a tapered top wall portion (22) provided on the leading end side relative to the peripheral wall portion (21).

9. The clamping apparatus according to claim 1, wherein the housing (1) includes:
a lower housing (2); and
a tubular upper housing (5), which is connected to a top surface of the lower housing (2) so as to be radially movable, and in which the support member (19) is inserted so as to be movable in the axial direction, and wherein
the clamp rod (7) includes:
a rod main body (52); and
a rod leading end portion (54) connected to a leading end portion of the rod main body (52) via a pin (53) so as to be movable in a radial direction of the rod main body (52), the rod leading end portion (54) being provided with the wedge surface (24).

10. The clamping apparatus according to claim 1, wherein the housing (1) includes:
a lower housing (2); and
a tubular upper housing (5), which is fixed to a top surface of the lower housing (2), and in which the support member (19) is inserted so as to be movable in the axial direction and a radial direction, and wherein
the clamp rod (7) includes:
a rod main body (52); and
a rod leading end portion (54) connected to a leading end portion of the rod main body (52) via a pin (53) so as to be movable in a radial direction of the rod main body (52), the rod leading end portion (54) being provided with the wedge surface (24).

11. A clamping apparatus comprising:
a housing (1);
a locking member (23) protruding toward a leading end side relative to the housing (1) and configured to be insertable into a hole (Wa) of a to-be-clamped object (W);
a clamp rod (7) including a wedge surface (24) configured to be engaged with the locking member (23) from the leading end side;
a driving means (13) configured to drive the clamp rod (7) toward a base end side for clamping action and to drive the clamp rod (7) toward the leading end side for unclamping action;
a support member (19) supporting a base end portion of the locking member (23) so that the locking member (23) is radially movable, the support member (19) being inserted in a leading-end-side portion of the housing (1) so as to be movable in an axial direction of the housing;
an engagement maintaining mechanism (26) which allows the wedge surface (24) of the clamp rod (7) to be engaged with the locking member (23) so as to be movable relative to each other; and
a relative movement restriction mechanism (31) configured to restrict radially outward movement of the locking member (23) relative to the clamp rod (7) within a predetermined range when the clamp rod (7) is driven toward the base end side for clamping action, wherein
the relative movement restriction mechanism (31) is an annular protrusion (30) provided at a leading-end-side end portion of the housing (1) and protruding radially inward, and a hole in the annular protrusion (30) has a diameter equal to or smaller than a diameter of the hole (Wa) of the to-be-clamped object (W).

* * * * *